United States Patent [19]

Odaka et al.

[11] Patent Number: 5,053,804
[45] Date of Patent: Oct. 1, 1991

[54] CAMERA HAVING COMPUTER

[75] Inventors: Yukio Odaka, Kanagawa; Yasuhiko Shiomi, Tokyo; Masanori Ohtsuka, Kanagawa, all of Japan

[73] Assignee: Canon Kabushiki Kaisha, Tokyo, Japan

[21] Appl. No.: 556,862

[22] Filed: Jul. 24, 1990

Related U.S. Application Data

[63] Continuation of Ser. No. 217,291, Jul. 7, 1988, abandoned.

[30] Foreign Application Priority Data

Jul. 10, 1987 [JP] Japan ................................. 62-172627
Sep. 17, 1987 [JP] Japan ................................. 62-233380
Dec. 3, 1987 [JP] Japan ................................. 62-306726
Dec. 3, 1987 [JP] Japan ................................. 62-306727

[51] Int. Cl.⁵ .............................................. G03B 7/26
[52] U.S. Cl. ................................................... 354/484
[58] Field of Search .................... 354/412, 484, 468

[56] References Cited

U.S. PATENT DOCUMENTS 4,645,326 2/1987 Kiuchi et al. .
4,662,736 5/1987 Taniguchi et al. .................. 354/484

FOREIGN PATENT DOCUMENTS 0048739 3/1984 Japan .................................. 354/484
0188934 9/1985 Japan .................................. 354/484

Primary Examiner—Russell E. Adams
Attorney, Agent, or Firm—Fitzpatrick, Cella, Harper & Scinto

[57] ABSTRACT

A camera of the kind operating under the control of a computer is arranged to shift an operating state of the computer from a normal mode to a hold mode for saving electric energy by detecting a drop in the voltage level of power supply during a load driving process or when an operation member is operated; and to prevent a faulty operation by varying, according to the kind of a load to be driven, a voltage-level-drop detecting level which is set for shifting the computer to the hold mode.

18 Claims, 20 Drawing Sheets

FIG.3 (VCC DETECTION CIRCUIT 6)

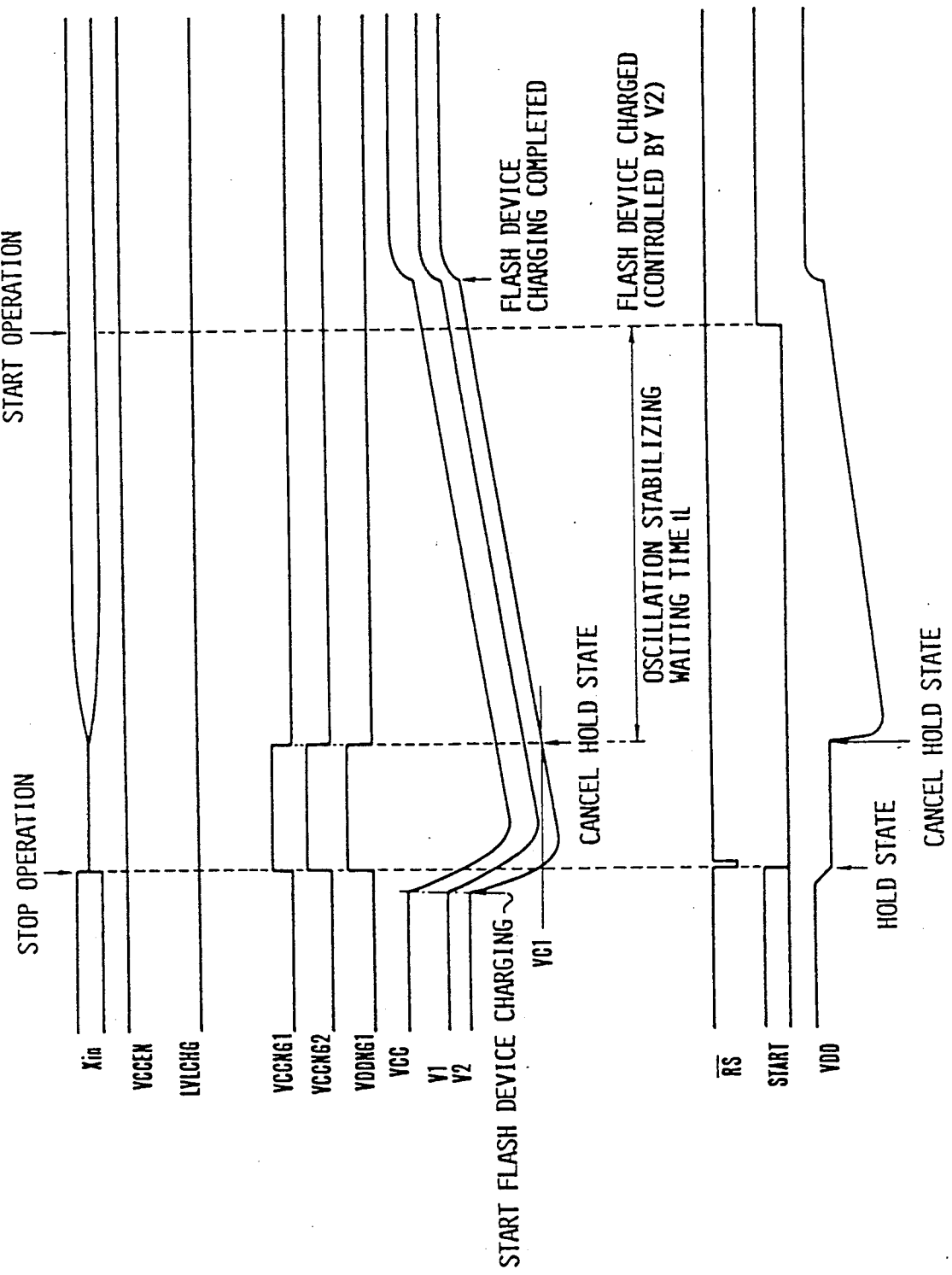

CAMERA HAVING COMPUTER

This application is a continuation of application Ser. No. 217,291 filed Jul. 7, 1988, now abandoned.

BACKGROUND OF THE INVENTION

1. Field of the Invention

This invention relates to a camera arranged to perform operation control by means of a computer.

2. Description of the Related Art

Heretofore, the CPU (central processing unit) adapted for use in a camera has been arranged for the purpose of controlling load circuits. Under a normal low-load, non-driving condition, the CPU is kept in a hold state in which current consumption remains at a low level for preventing a power source battery from being wasted. The hold state is cancelled and shifted to an operative state in starting control over various circuits by allowing an oscillation circuit to operate only when some load must be driven, for example, in response to an operation on the shutter release button of the camera. The hold state has been arranged to be cancelled by supplying an ON signal representing a closed state of a switch SW1 which is interlocked with the release button to the hold control terminal of the CPU either directly or via a chattering absorption circuit and a logic circuit. However, the above stated conventional arrangement has presented problems as described below:

(i) With the ON signal of the switch SW1 arranged to be directly supplied, the hold state is often cancelled by external noise, static electricity, etc. The power source battery tends to be consumed by this. Further, in some case, this causes a whole photo-taking operation to be ruined by a faulty action of the CPU.

(ii) The above-stated problem (i) may be effectively solved by adding a chattering absorption circuit to the camera. However, the addition of this circuit solely for this purpose is expensive and also disadvantageous in terms of space.

(iii) It is always possible that the photographer might untimely free the shutter release button from a depressing operation thereon before completion of a photo-taking process. To prevent this, therefore, the camera must be provided with some holding means, which, however, makes the camera designing work very troublesome.

Further, the loads on the camera often include not only a first group of load circuits which must be operated under the control of the CPU by rendering the CPU operative, such as control over an AF circuit, etc. but also a second group of many load circuits which can be allowed to operate without any control by the CPU such as an electric charging operation on a flash circuit, etc. The camera of this kind does not have to have the CPU always rendered operative in driving loads. If the CPU is arranged to be rendered operative in driving any of the second group of load circuits, the power source battery would be wastefully consumed.

Since the actions of the first group of load circuits must be controlled by the CPU while they are driven, the CPU must unfailingly be kept operative while any of the loads is driven. However, it is preferable that, after completion of the load driving operation, the CPU is immediately brought into a hold state. In the case of the second group of load circuits, the CPU must be shifted to the hold state immediately after commencement of a driving operation on the loads.

SUMMARY OF THE INVENTION

A first aspect of the the invention under the present application resides in a camera which is of the kind having a CPU, or a computer, and is operating under the control of the CPU, wherein, when the CPU is required to control a load circuit in response to an operation performed on an operation member, the CPU is shifted from a hold state to an operative state by detecting a change in the state of power supply to the load circuit caused by the operation on the operation member. The camera according to the invention eliminates the above stated shortcomings of the conventional camera which has been arranged to shift the CPU from the hold state to the operative state by detecting an operation performed on the operation member.

A second aspect of the invention resides in an arrangement of the above stated camera, wherein the CPU is shifted from a hold state to an operative state by detecting a voltage change in a power supply to a load circuit resulting from an operation performed on the above stated operation member.

A third aspect of the invention resides in a camera of the kind having a first load arranged to operate under the control of a CPU and a second load arranged to operate without requiring the control by the CPU, wherein the CPU is arranged to be shifted from a hold state to an operative state when a power supply is effected to the first load and to be shifted to the hold state when a power supply is effected to the second load. The camera arranged in this manner according to the invention is capable of solving the above stated problems of the conventional camera operating under the control of a CPU.

A fourth aspect of the invention resides in an arrangement of the above stated camera, wherein, for shifting the CPU from the operative state to the hold state by detecting a voltage level change resulting from a power supply to the load, the voltage level at which the CPU is to be shifted from the operative state to the hold state at the time of power supply to the first load is set at a value lower than the voltage level at which the CPU is to be shifted from the operative state to the hold state at the time of power supply to the second load. The arrangement enables the CPU to control the first load without shifting to the hold state at the time of a voltage level drop occurred when the power supply is effected to the first load. At the time of power supply to the second load, the CPU is immediately shifted to the hold state to back up the power source when the power supply is effected to the second load.

A fifth aspect of the invention resides in another arrangement of the above stated camera, wherein a flash device is employed as the second load (circuit); the CPU is shifted to the hold state by detecting a voltage change taking place in charging the flash device; and the CPU is shifted from the hold state back to an operative state before the charging process on the flash device is completed with the power source voltage level coming back to an original level.

A sixth aspect of the invention resides in a further arrangement of the above stated camera wherein, in shifting the CPU from the hold state to the operative state according to a voltage level change taking place during a load driving process, a time interval at which the hold state is to be shifted to the operative state is changed according to the kind of the driving load and the operating state of the camera such as the degree of the voltage drop, etc. in such a way as to stabilize the operation of a pulse circuit which is arranged to supply a clock signal to the CPU for use in shifting the hold state to the operative state, so that the period of time required in bringing the CPU from the hold state to the operative stated can be always adequately adjusted.

These and other aspects and features of the invention will become apparent from the following detailed description of embodiments thereof taken in connection with the accompanying drawings.

BRIEF DESCRIPTION OF THE DRAWINGS

FIG. 13 is a timing chart showing the operation of the embodiment shown in FIG. 10.

DETAILED DESCRIPTION OF THE PREFERRED EMBODIMENTS

Figure 1:
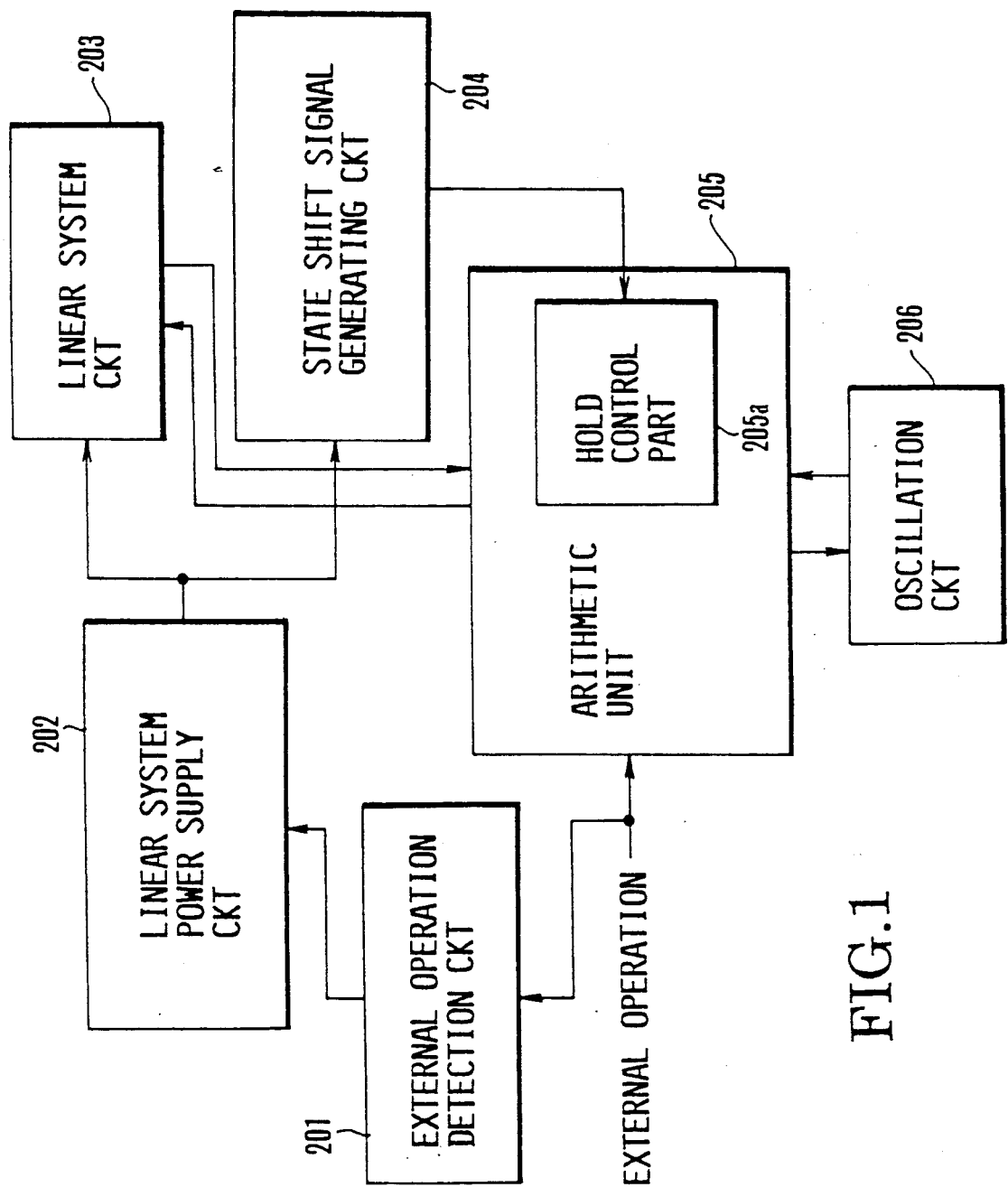
FIG. 1 is a block diagram showing a camera arranged according to this invention as an embodiment thereof.

The details of this invention are as described below with reference to the accompanying drawings which show some the of preferred embodiments of the invention:

FIG. 1 is a block diagram showing a camera arranged as an embodiment of the invention. When the camera is left inoperative with no operation such as a shutter release operation performed on the camera from outside, an external operation detection circuit 201 produces no instruction signal for a power supply. A linear system power supply circuit 202, therefore, does not make any linear system power supply to a linear system circuit 203, which consists of a light measuring circuit, a distance measuring circuit, a motor driving circuit, a flash circuit, etc. Under this condition, a state shift signal generating circuit 204 detects that the output level of a linear system power source is below a given state shift level. The circuit 204, therefore, produces an instruction signal for a shift to a hold state. This hold state shift instruction signal is supplied to a hold control part 205a which is disposed within an arithmetic unit 205. This brings the arithmetic unit 205 into a hold state which is a low energy consuming state.

Upon detection of an external operation during the hold state, the external operation detection circuit 201 supplies a power supply instruction signal to the linear system power supply circuit 202. In response to this signal, a linear system power supply to the linear system circuit 203 begins. The state shift signal generating circuit 204 then detects that the output of the linear system power source is at a level higher than the given state shift level. The circuit 204 supplies an instruction signal for a shift to an operative state to the hold control part 205a disposed within the arithmetic unit 205. Upon receipt of this signal, the arithmetic unit 205 comes back to an operative state. The unit 205 immediately cause an oscillation circuit 206 to generate a reference clock signal which is necessary for controlling the linear system circuit 203. The arithmetic unit 205 then begins to perform driving control over the above-stated linear system circuit 203.

When no operation is performed again from outside for a given period of time after completion of the operation described above, the external operation detection circuit 201 is no longer allowed to supply the power supply instruction signal to the linear system power supply circuit 202. Therefore, the linear system power supply from the linear system power supply circuit 202 to the linear system circuit 203 comes to a stop. The state shift signal generating circuit 204 again comes to detect that the output of the linear system power source is lower than the given state shift level. Then, the instruction signal for shifting to the hold state is supplied to the hold control part 205a of the arithmetic unit 205. The arithmetic unit 205 then resumes a hold state.

In short, the operative state and the hold state of the arithmetic unit 205 are arranged to be controlled according to whether or not the linear system power supply is made to the linear system circuit 203 in response to an external operation.

Figure 2:
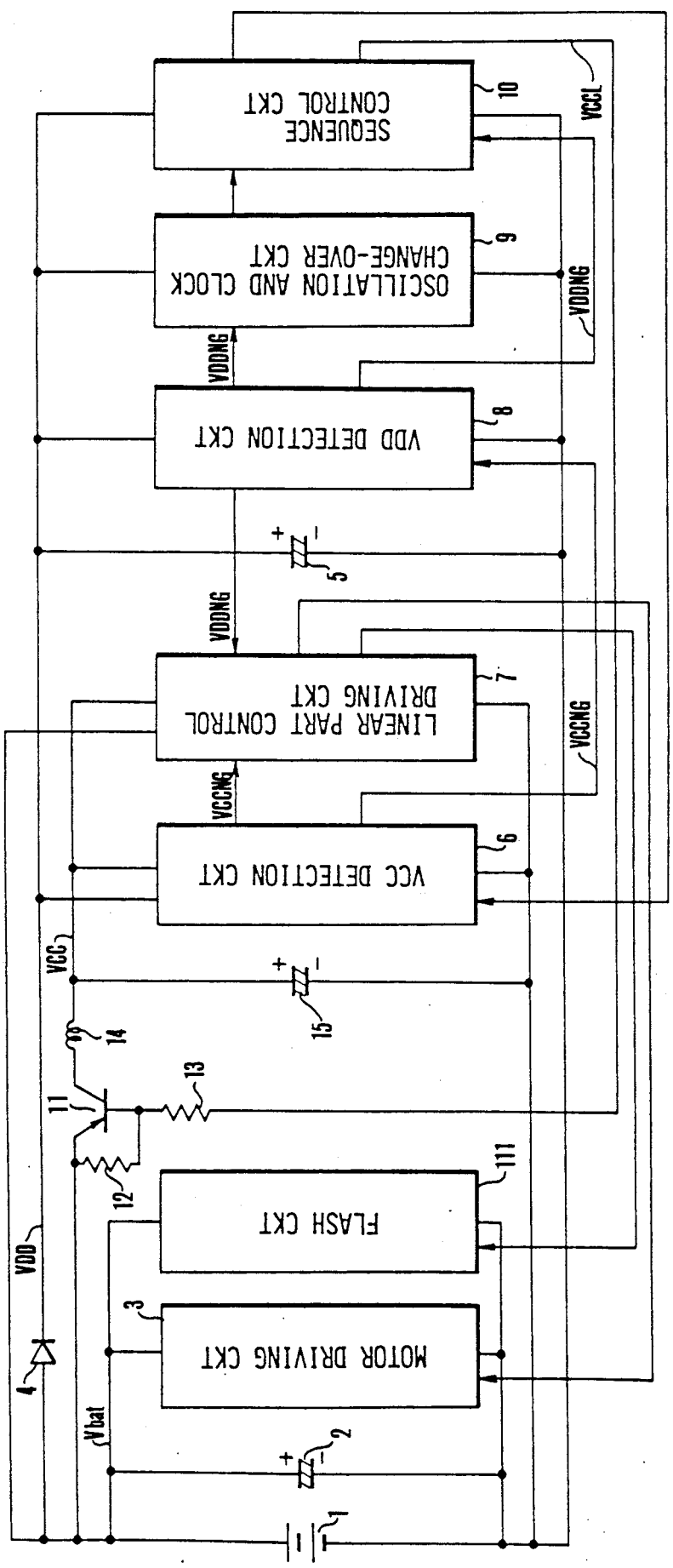
FIG. 2 is a block diagram showing the details of the embodiment shown in FIG. 1.

FIG. 2 is a block diagram showing in outline a circuit arrangement of the camera of FIG. 1 according to the invention. The output Vbat of a power source battery 1 which is loaded in the camera is supplied via a capacitor 2 to a motor driving circuit 3 and to a flash circuit 111. The output Vbat also becomes the output VDD of a reverse-current preventing diode 4. The output VDD is supplied to a VCC detection circuit 6, a linear part control driving circuit 7 which is provided for control over the linear system including the above-stated motor driving circuit 3, etc., a VDD detection circuit 8, an oscillation and clock change-over circuit 9 and a sequence control circuit 10. The output Vbat further becomes an output VCC via a VCC power supply circuit consisting of a transistor 11 which is controlled by the output VCCL of the sequence control circuit 10 and resistors 12 and 13; a choke coil 14; and a capacitor 15. The output VCC thus obtained is supplied to the VCC detection circuit 6 and the linear part control driving circuit 7. The VCC detection circuit 6 produces an output VCCNG, which is supplied to the linear part control driving circuit 7 and the VDD detection circuit 8. The VDD detection circuit 8 produces an output VDDNG, which is supplied to the linear part control driving circuit 7, the oscillation and clock change-over circuit 9 and the sequence control circuit 10.

Figure 3:
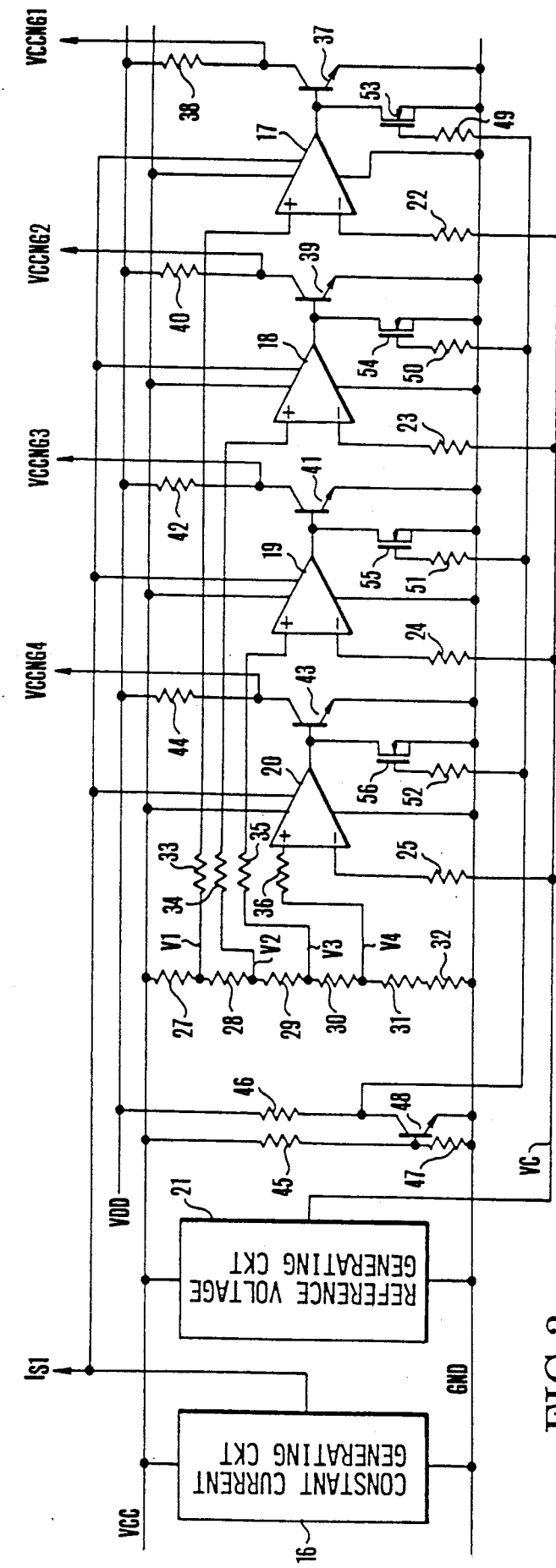
FIG. 3 is a circuit diagram showing by way of example the details of a VCC detection circuit which is included in FIG. 2.

FIG. 3 shows by way of example the internal arrangement of the VCC detection circuit 6 of FIG. 2. A constant current generating circuit 16 is arranged to generate a constant current Is1. The constant current Is1 is supplied as a bias current to comparators 17, 18, 19 and 20. To the inverting input terminals of these comparators 17 to 20 is applied the output VC of a reference voltage generating circuit 21 which is applied as comparison voltages via resistors 22, 23, 24 and 25. The non-inverting input terminals of these comparators are receiving, via resistors 33, 34, 35 and 36, divided voltages V1, V2, V3 and V4 which are obtained by voltage-dividing the above stated output VCC by means of resistors 27, 28, 29, 30, 31 and 32. The output of the comparator 17 which compares a given voltage of the output VCC with the voltage Vc is produced via a transistor 37 and a resistor 38 as an output VCCNG1 of the VCC detection circuit 6. The output of the comparator 18 is likewise produced as an output VCCNG2 via a transistor 39 and a resistor 40. The output of the comparator 19 is produced as an output VCCNG3 via a transistor 41 and a resistor 42. The output of the comparator 20 is produced as an output VCCNG4 via a transistor 43 and a resistor 44. Resistors 45, 46 and 47, a transistor 48, resistors 49, 50, 51 and 52 and MOS transistors 53, 54, 55 and 56 jointly form a PUC circuit. The PUC circuit is arranged to prevent an erroneous determination when the level of the output VCC drops. The outputs VCCNG2 to VCCNG4 and the circuit elements generating them are not directly related to this embodiment. Therefore, the details of them are omitted from description.

Figure 4:
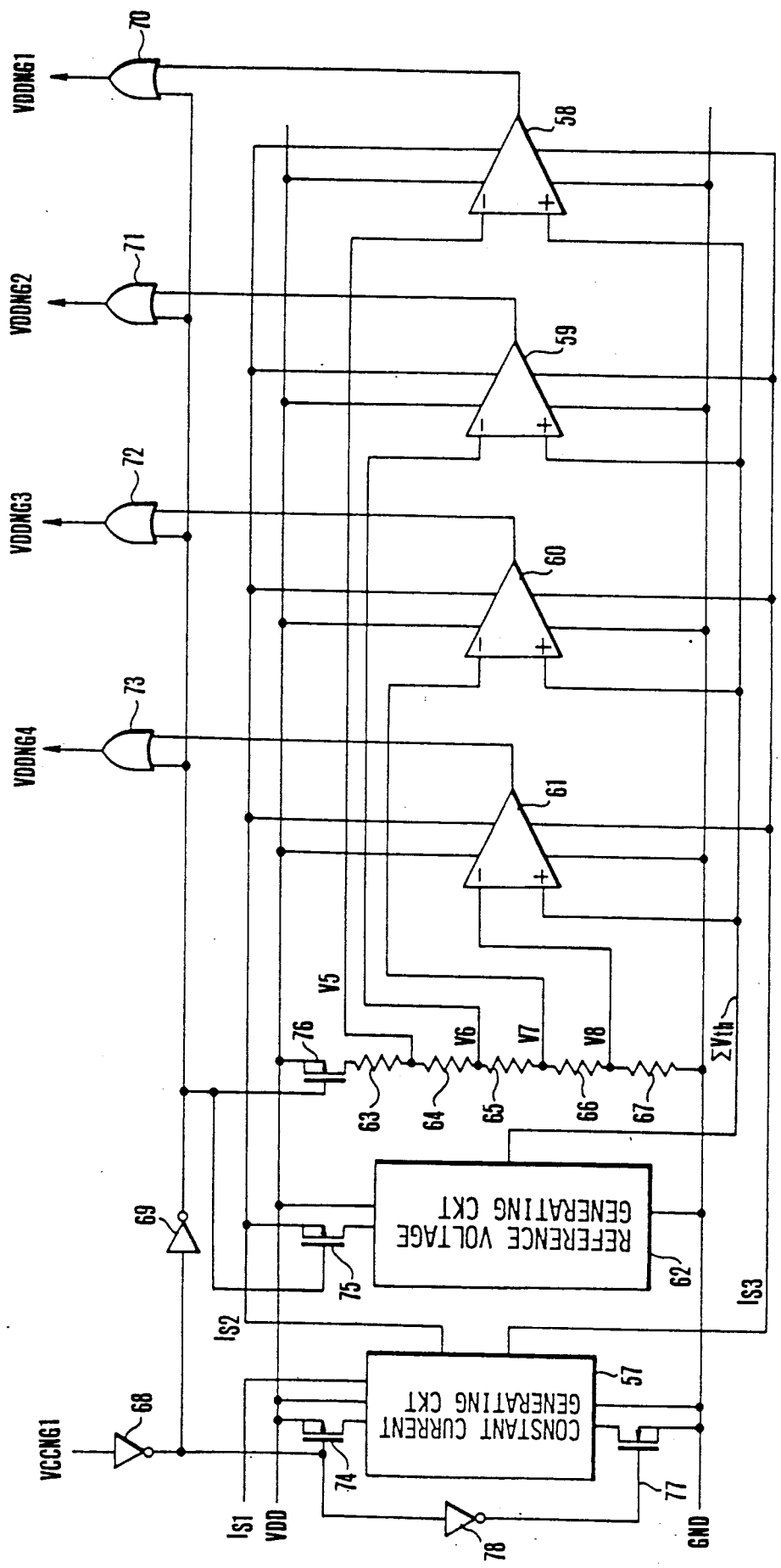
FIG. 4 is a circuit diagram showing by way of example the details of a VDD detection circuit included in FIG. 2.

FIG. 4 show by way of example the internal arrangement of the VDD detection circuit 8 of FIG. 2. A constant current generating circuit 57 is arranged to generate constant currents Is2 and Is3. The current Is2 and Is3 are supplied as bias currents to comparators 58, 59, 60 and 61. The non-inverting input terminals of the comparators 58 to 61 have the output $\Sigma$Vth of a reference voltage generating circuit 62 applied thereto. To the inverting input terminals of these comparators are applied divided voltages V5, V6, V7 and V8 which are obtained by voltage-dividing the output VDD by means of resistors 63, 64, 65, 66 and 67. The output VCCNG1 which is produced from the VCC detection circuit 6 as mentioned in the foregoing and the output of the above stated comparator 58 become an output VDDNG1 of the VDD detection circuit 8 via an OR gate 70. The output VCCNG1 and the output of the comparator 59 become another output VDDNG2 via an OR gate 71. The output VCCNG1 and the output of the comparator 60 become an output VDDNG3 via an OR gate 22. The output VCCNG1 and the output of the comparator 61 become an output VDDNG4 via an OR gate 73.

MOS transistors 74, 75 and 76 are arranged to turn off when high level signals are supplied to them. Another MOS transistor 77 turns on when a high level signal is supplied thereto via an inverter 78. Further, the above stated outputs VDDNG2 and VDDNG4 of the circuit 8 and the circuit elements generating them are not directly related to this embodiment. Therefore, they require no further description.

Figure 5:
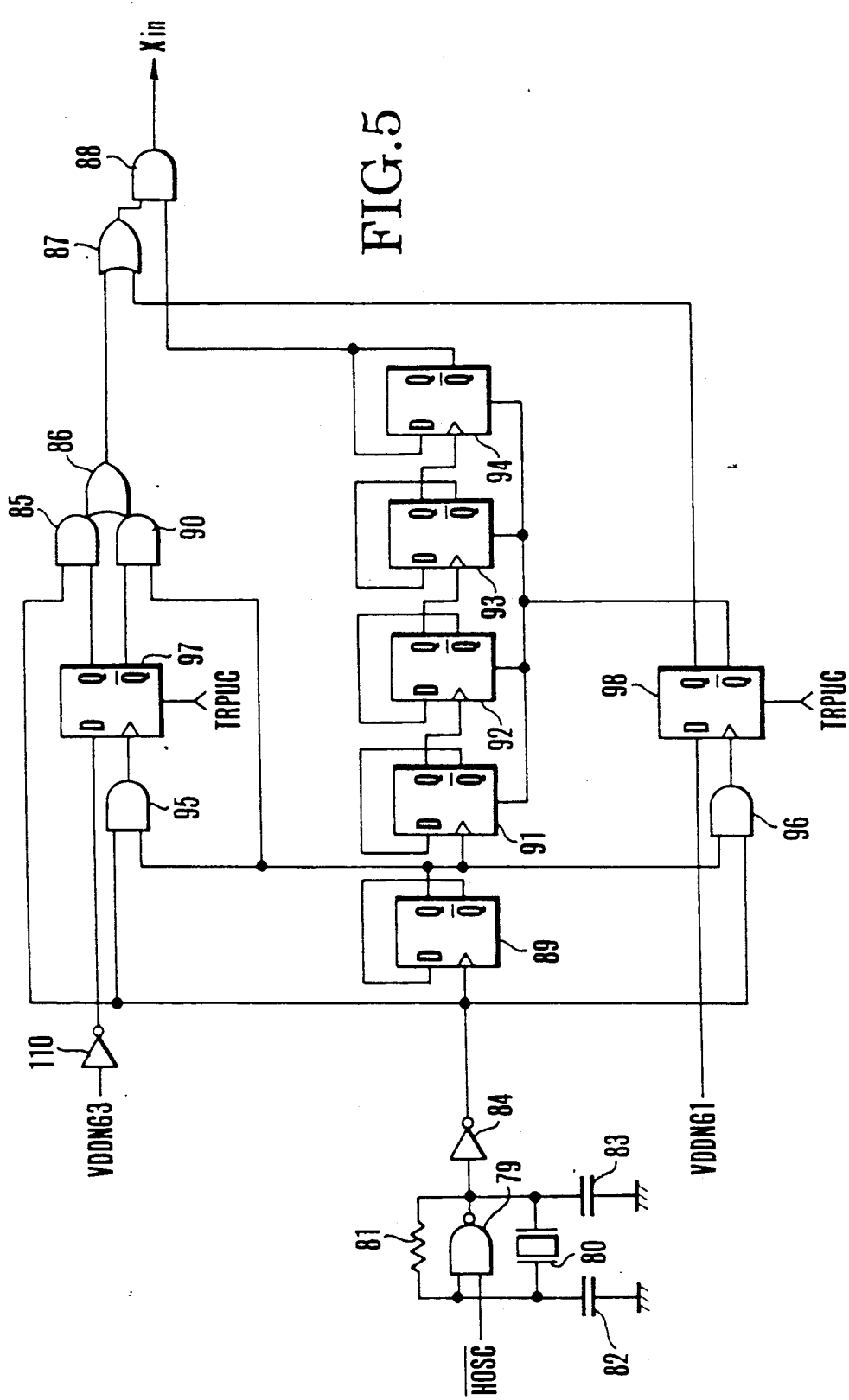
FIG. 5 is a circuit diagram showing by way of example the details of an oscillation and clock change-over circuit which is included in FIG. 2.

FIG. 5 shows by way of example the internal arrangement of the oscillation and clock change-over circuit 9 of FIG. 2. A NAND gate 79, a crystal 80, a feedback resistor 81 and capacitors 82 and 83 jointly form an oscillation circuit. The oscillation circuit is arranged to receive the output $\overline{HOSC}$ of an oscillation stabilizing stand-by circuit disposed within the sequence control circuit 10 as will be described later herein and to oscillate under the control of this input. When both the outputs VDDNG1 and VDDNG3 of the VDD detection circuit 8 are at low levels, the circuit 9 produces a frequency output Xin at the same frequency as the output of the oscillation circuit via an inverter 84, an AND gate 85, OR gates 86 and 87 and an AND gate 88. When the output VDDNG3 is alone at a high level, the circuit 9 produces the output Xin at a frequency which is obtained by frequency-dividing by 2 the output of the oscillation circuit via the inverter 84, a frequency divider 89, an AND gate 90, the OR gates 86 and 87 and the AND gate 88. In case that the output VDDNG1 is alone at a high level, the circuit 9 produces the output Xin at a frequency which is obtained by frequency-dividing by $2^5$ the output of the oscillation circuit via the inverter 84, frequency dividers 89, 91, 92, 93 and 94 and the AND gate 88. The oscillation and clock change-over circuit 9 further includes AND gates 95 and 96, D-type flip-flops 97 and 98 and an inverter 110.

Figure 6:
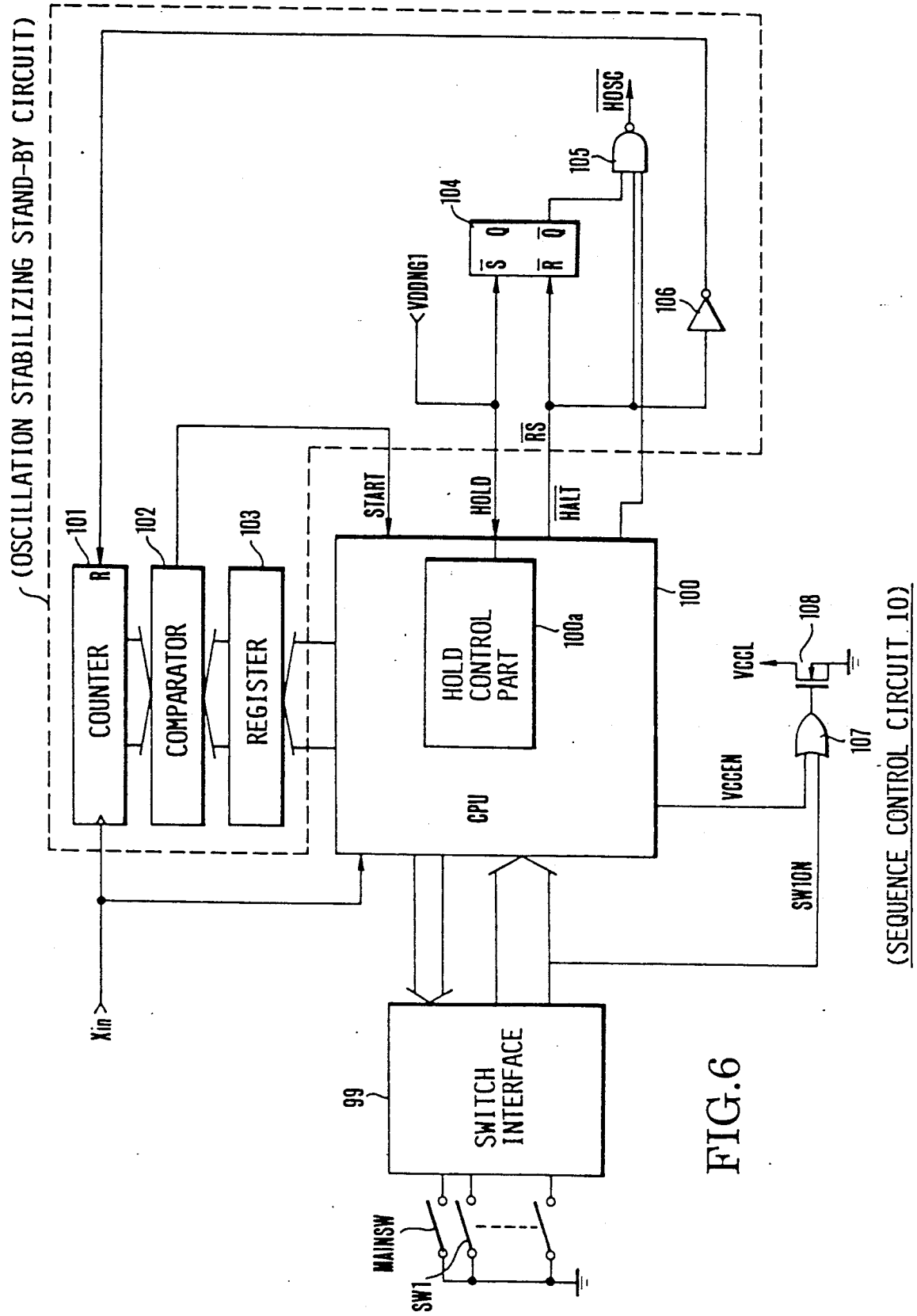
FIG. 6 is a circuit diagram showing by way of example the details of arrangement of a sequence control circuit shown in FIG. 6.

FIG. 6 shows by way of example the internal arrangement of the sequence control circuit 10 of FIG. 2. Information on the positions of various switches including a switch SW1, a main switch MAINSW, etc. is taken into a CPU 100 through a switch interface 99. The CPU 100 includes a hold control part 100a which is arranged to control the operative state and the hold state of the CPU 100. The CPU 100 is arranged to be forcedly shifted by a hardware arrangement from an operative state to a hold state when the level of the output VDDNG1 supplied to the hold control terminal HOLD of the CPU 100 changes from a low level to a high level, and to be shifted by a softwear arrangement from the hold state to the operative state when the level of the hold control terminal HOLD is detected to be at a low level. The sequence control circuit 10 includes an oscillation stabilizing stand-by circuit which is composed of a counter 101; a comparator 102; a resistor 103; an RS type flip-flop 104; a NAND gate 105 arranged to generate the output HOSC which serves as a signal for controlling the operation of the oscillation circuit described in the foregoing; and an inverter 106. An OR gate 107 is arranged to produce a high level output thereof when the level of the output SW10N of the switch interface 99 or that of the output VCCEN of the CPU 100 becomes a high level. The high level output of the OR gate 107 turns on a MOS transistor 108 to cause it to produce an output VCCL at a low level. The low level output of the MOS transistor 108 is supplied to the transistor 11 of FIG. 2. Further, when the hold state is obtained with the CPU 100 driven by the output Xin of the oscillation circuit, the oscillation circuit ceases to operate and the CPU 100 remains inoperative.

With the camera arranged as described above, the camera performs a series of operations as briefly described below with reference to a flow chart of FIG. 7:

A switch SW1 is arranged to be turned on by the first stroke of operation on a shutter release button. The switch SW1 produces an output SW1ON when the switch SW1 is operated while it is in a state of waiting for an operation (hereinafter referred to as SW1 WAIT state). The camera then performs a battery check, a distance measuring operation and a light measuring operation. Then, if flash photography is considered necessary, the camera immediately begins to charge a flash device. When there is produced an ON signal of a switch SW2 which is arranged to turn on in response to a second stroke of operation on the shutter release button after completion of the flash charging process, a photo taking operation is performed with AF control and shutter control. Upon completion of the photo taking operation, a film is wound and the camera comes back to the SW1 WAIT state.

Since no control is performed before the switch SW1 turns on during the above stated series of operations, the CPU 100 can be left in a hold state and rendered operative only when a control action is required. The electric energy consumption of the camera can be lowered by such arrangement. In view of this, the embodiment is arranged to determine the shift of the CPU 100 to the hold state according to whether a control action is initiated by the switch SW1 in the SW1 WAIT state.

Next, the selection of the hold state or the operative state of the CPU 100 are controlled as follows: FIG. 8 is a flow chart showing the operation of the embodiment in the SW1 WAIT state. The CPU 100 is in the hold state when the switch SW1 is in an off-state under the condition of a step #520. Referring to FIG. 8, the CPU 100 is assumed to be temporarily rendered operative with the switch SW1 turned on under this condition. At steps #500 and #501: A timer 1 which is disposed within the CPU 100 is first reset and, after that is started. At a step #502: A check is made for the state of the main switch MAINSW. If the main switch MAINSW is found to be in an on-state, the flow of operation proceeds to a step #503. Step #503: A check is made for the state of the switch SW1. If the switch SW1 is found in an on-state, the battery check, distance and light measuring actions, etc. are carried out during the on-state of the switch SW1 with the CPU 100 left in the operative state as described in the foregoing with reference to FIG. 7. In case that either the main switch MAINSW or the switch SW1 is in an off-state, the flow of operation proceeds to a step #504. Step #504: A flag ALENDL which indicates whether an automatic loading action has been completed or not is checked for its state. If the flag ALENDL is found to have been reset, the flow proceeds to a step #505. Step #505: The back cover of the camera is checked for a closed state thereof. If the back cover is found closed, a blank film advance action is performed as shown in FIG. 7 provided that a DX code is detected at a step #509. In case that the flag ALENDL is found to be in a set state, the flow comes to a step #506. Step #506: The back cover is checked for its closed state. If the back cover is then found open, the flow comes to a step #507. Step #507: The flag ALENDL is reset. At a step #508: The flow waits a given period of time for absorption of chattering before proceeding to a step #511. Step #511: The timer 1 is checked to see if the value thereof has reached a value Tw. The operation to detect the state of the switch SW1 described above is continuously performed until the value of the timer 1 reaches the value Tw. In other words, with the back cover in a closed state, a program is allowed to proceed from the step #500 by temporarily turning the switch SW1 on to render the CPU 100 operative. After that, the switch SW1 is left in its off-state for a period of time Tw defined by the timer 1. When the value of the timer 1 reaches the value Tw, the flow comes to a step #512. Step #512: The counting action of the timer 1 is brought to a stop. At a next step #513: The level of the output VCCEN is caused to become a low level. Then, since the switch SW1 is in the off-state, the output SW1ON is at a low level. The above stated output VCCEN is also at a low level. Therefore, the output level of the OR gate 107 of FIG. 6 also becomes low. As a result, the output VCCL of the MOS transistor 108 which is provided for latching the output VCC comes to have a high impedance. The transistor 11 of FIG. 2 then turns off. The power supply to the VCC system comes to a stop. Then, as shown in a timing chart in FIG. 9, the level of the output VCC gradually decreases. In other words, since the capacitor 15 continues to be charged until the transistor 11 turns off, the electric charge of the capacitor 15 is discharged when the transistor 11 turns off to cause the gradual decrease of the level of the output VCC.

With the level of the output VCC dropped as mentioned above, when the divided voltage V1 which is obtained by dividing the level of the output VCC (see FIG. 3) becomes lower than the reference voltage VC, the level of the output VCCNG1 which is obtained through the comparator 17, the transistor 37 and the resistor 38 becomes high. At the VDD detection circuit 8 of FIG. 4, the MOS transistors 74 and 77 are turned on through the inverters 68 and 78 when the level of the output VCCNG1 becomes high. Then, since this cuts off the supply of the output currents Is2 and Is3 of the constant current generating circuit 57, the levels of the outputs of all the comparators 58 to 61 become high and the output VDDNG1 of the OR gate 70 also becomes high. Again referring to FIG. 8, at a step #513 of the flow chart: After the power supply for the output VCC (output VCCEN=low level) is cut off, the flow comes to a step #514. Step #514: A timer 2 which is disposed within the CPU 100 is reset. Step #515: The timer 2 is started. Step #516: The flow waits until the counted value of the timer 2 reaches a value TDC. The waiting time is set at such a length that is required for the output VDDNG1 to become a high level with the output VCC having come to drop to a sufficiently low level after the power supply for the output VCC is cut off as mentioned above. Step #517: The counting action of the timer 2 is brought to a stop when the counted value of the timer 2 reaches the value TDC of time length. Step #518: The CPU 100 sets an oscillation stabilizing waiting time "ts" at the register 103. Further, at this point of time, the hold control terminal HOLD of the CPU 100 receives the output VDDNG1 at a high level as the output VDDNG1 has become a high level as mentioned above. Then, the content of each of the various registers within the CPU 100 is temporarily retracted to the inside of a RAM and is thus ready for holding. The flow comes to a step #519 when there has been obtained this hold ready state. Step #519: output terminal $\overline{\text{HALT}}$ of the CPU 100 is set at a low level. The output $\overline{\text{RS}}$ is thus caused to become a low level to reset the $\overline{\text{RS}}$ flip-flop 104 thereby. The counter 101 is also reset through the inverter 106. Step #520: The level of the output RS is caused to become high. Then, the level of the output $\overline{HOSC}$ of the NAND gate 105 becomes low. This output is applied to the input terminal of the NAND gate 79 which forms the oscillation circuit of FIG. 5. This stops the oscillation circuit from oscillating to bring the CPU 100 into an inoperative state, i.e. the hold state.

Figure 8:
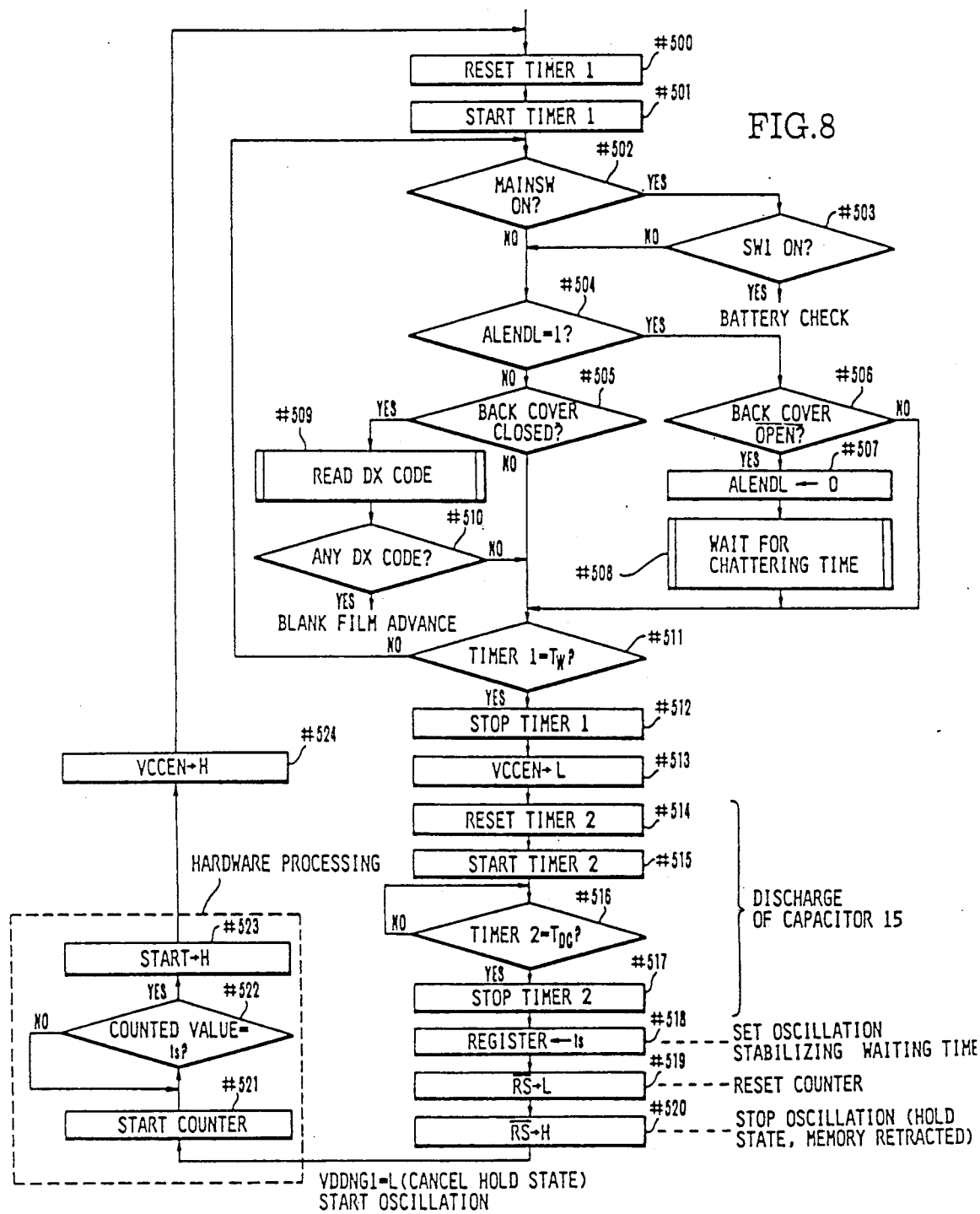
FIG. 8 is a flowchart showing the operation of essential parts of the same camera.
Figure 9:
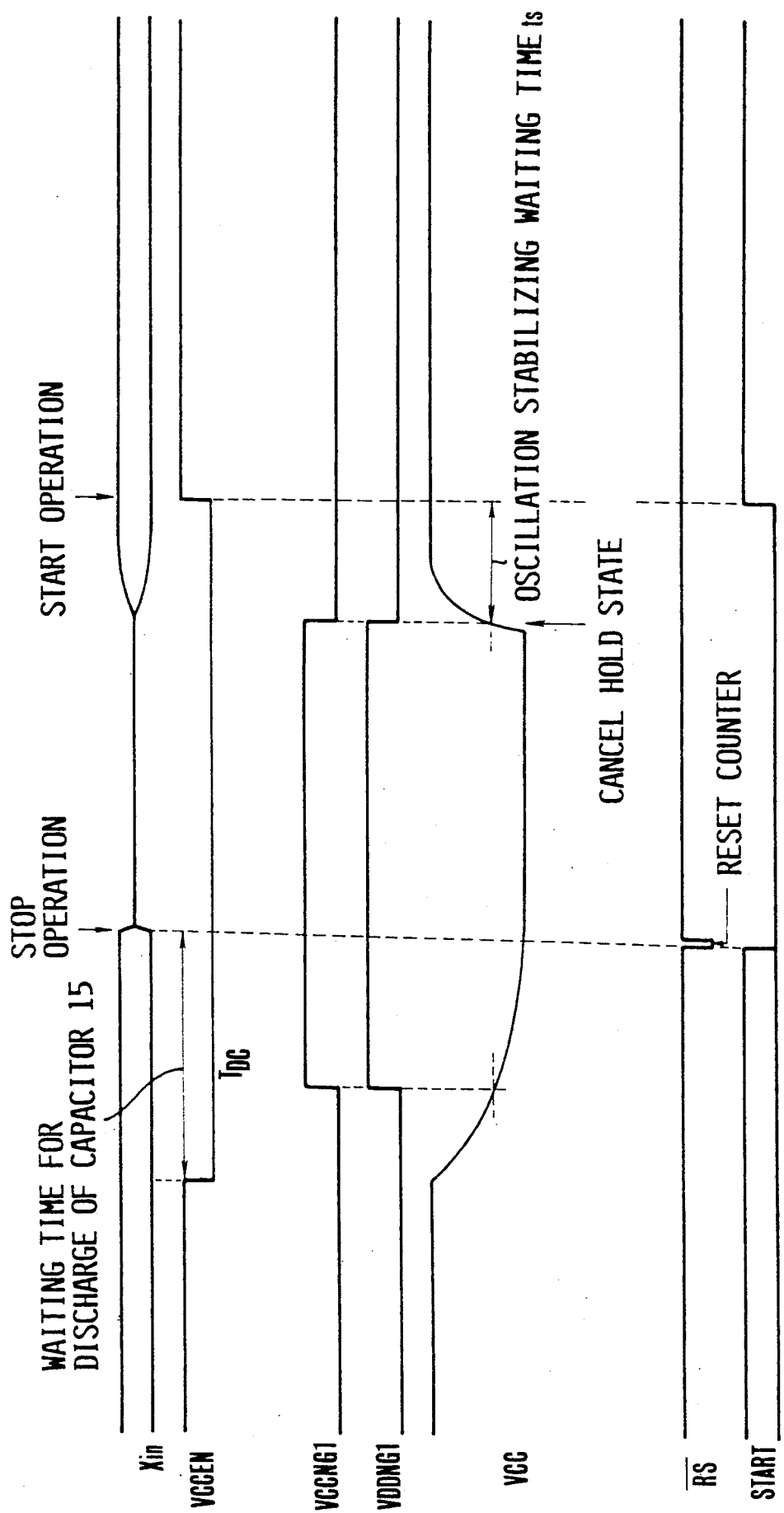
FIG. 9 is a timing chart showing the operation of the same essential parts.

When the switch SW1 is not operated for a given period of time, the state of the CPU 100 comes to stop operating and shifts to its hold state. In the flow of operation of FIG. 8, the program ensuing the step #520 is brought to a stop. In the above stated hold state, if the output SW10N comes to be produced at a high level through the switch interface 99, for example, with the switch SW1 turned on, the MOS transistor 105 is turned on via the OR gate 107. The level of the output VCCL of the transistor 105 then becomes low. The low level output VCCL causes, via the resistors 12 and 13 of FIG. 2, the transistor 11 to turn on. Then, a power supply to the VCC system begins. When the level of the output reaches a given level as a result of the power supply as shown in FIG. 9, the divided voltage V1 of the output VCC indicated in the internal arrangement of the VCC detection circuit 6 shown in FIG. 3 comes to exceed the reference voltage VC. The output of the comparator 17 is then inverted and the level of the output VCCNG1 becomes low through the transistor 37 and the resistor 38. Meanwhile, with the level of the output VCCNG1 having become low, the constant current generating circuit 57, the reference voltage generating circuit 62 and resistors 63 to 67 of the VDD detection circuit 8 shown in FIG. 4 are all brought into enabled states via the inverters 68, 69 and 78. The level of the comparator 58 which compares the divided voltage V5 of the output VDD with the output ΣVth of the reference voltage generating circuit 62 is low when the divided voltage V5 is higher than the latter. In the case, therefore, the output VDDNG1 of the OR gate 70 also becomes low. With the level of the output VDDNG1 having become low, the RS flip-flop 104 of FIG. 6 is set and the level of the $\overline{Q}$ output thereof also becomes a low level. Therefore, the level of the output $\overline{HOSC}$ of the NAND gate 105 becomes high. This causes the oscillation circuit of FIG. 5 to begin to operate. Further, since the low level output VDDNG1 is supplied to the hold control terminal HOLD, the CPU 100 becomes operative. With the oscillation circuit thus coming to operate, the output Xin begins to be supplied as a clock signal from the AND gate 88. Then, as shown at a step #521 of the flow chart, the counter 101 begins to perform a counting action. The comparator 102 is comparing the counted value of the counter 101 with the timer value "ts" set at the register 103. When the value of the counter 101 becomes equal to the timer value "ts", the output START is produced at a high level. With this output START supplied to the CPU 100, the CPU 100 is immediately changed from an operable state to an operative state. The CPU 100 then execute an ensuing program according to the clock signal. The flow of operation thus proceeds to a step #524. Step #524: The level of the output VCCEN becomes high to retain the power supply to the VCC system. Then, the flow proceeds to the step #500 to allow the timer 1 to operate. After that, the positions and states of the various switches begin to be detected in the same manner as described in the foregoing. The steps #521, #522 and #523 in the flow chart are carried out not by a program but by hardware circuits 101 to 103. As a result, the output START is produced from the comparator 102.

The flow proceeds from the step #520 to the step #524. In the embodiment, the CPU 100 is arranged to be shifted between the hold state and the operative state according to the power supply state of the linear system circuits. In other words, the arrangement of the embodiment is based on the fact that the linear system circuit always operates when the camera is in an operative state. The CPU is shifted from the hold state to the operative state when the voltage of the power supply to the linear system circuit is brought to an operable level, for example, by a shutter release operation or the like. The arrangement prevents an erroneous shift to the hold state and an erroneous cancellation thereof due to static electricity, etc. It also effectively prevents the waste of battery and erroneous actions. Further, with a filter of the power supply system used in combination, it obviates the necessity of a chattering absorption circuit. The operative state also can be retained without recourse to any special logical circuit arrangement. The arrangement of the embodiment is, therefore, highly advantageous in terms of cost and space.

The motor driving circuit 3 and the flash circuit 111 are arranged to be driven and controlled by the linear part control driving circuit 7. The circuit 7 shifts from an operative state to an inoperative state to bring about the hold state, as mentioned above, and shift from the inoperative state to the operative state to shift the hold state to the operative state.

The embodiment is arranged to have the CPU 100 shifted from the hold state to the operative state by hardware means and from the operative state to the hold state by software means. However, the invention is not limited to this arrangement. With respect to the cancellation and shift from the hold state by hardware means, it can be carried out according to a simple modification of the words and flowcharts described in the foregoing. As regards the cancellation and shift from the hold state by edge detection, the same advantageous effect is attainable by just replacing the level detecting arrangement with some edge detection circuit. Further, in case the camera has a CPU which, unlike the CPU 100 of FIG. 6, is provided with no hold control terminal HOLD and no output terminal $\overline{HALT}$, the CPU must have some terminals that are usable in place of these terminals as long as it is arranged to be shiftable to a hold state. In that case, such terminals can be replaced with words.

In the case of FIG. 2, the VCC power supply circuit is arranged to form a π-type filter. However, this arrangement may be replaced with an arrangement simply consisting of a regulator, a transistor and a capacitor.

Figure 10:
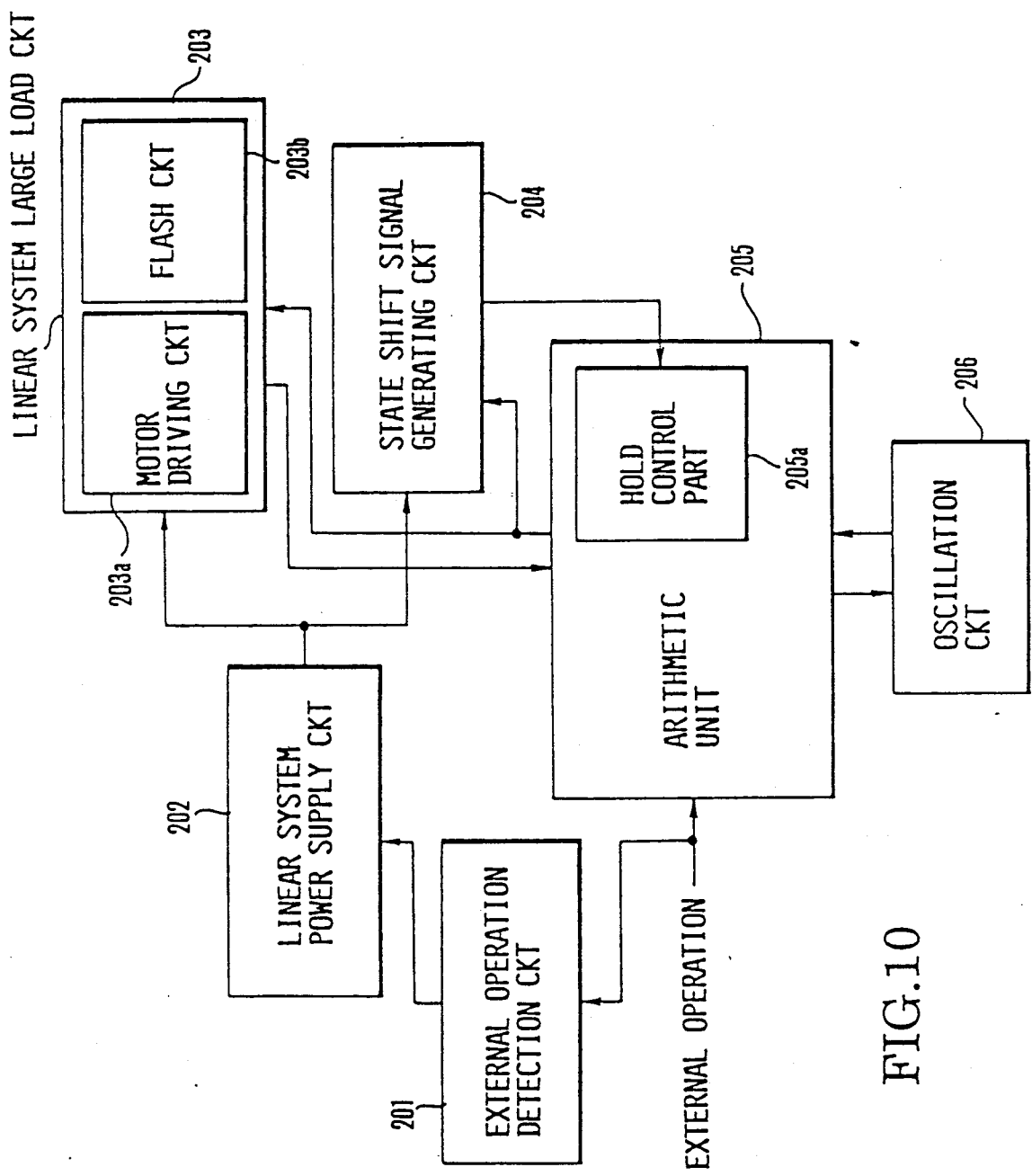
FIG. 10 is a block diagram showing a camera arranged according to this invention as another embodiment thereof.

FIG. 10 shows in a block diagram another embodiment of this invention. This embodiment differs from the embodiment shown in FIG. 1 in that the hold control of the CPU is arranged to be performed for a load to be controlled by the CPU and a load not controlled by the CPU.

The details of the embodiment shown in FIG. 10 are as follows: An external operation detection circuit 201 produces no signal indicative of a power supply when the camera is left intact with no external operation such as a shutter release operation performed thereon. Under this condition, therefore, a linear system large load circuit 203 which includes a motor driving circuit 203a, a flash circuit 203b, etc. is not receiving a linear system power supply from a linear system power supply circuit 202. In this instance, therefore, like in the case of the embodiment shown in FIG. 1, a state shift signal generating circuit 204 produces an instruction signal for shifting to a hold state and supplies it to a hold control part 205a which is disposed within an arithmetic unit 205. In response to this hold state shift instruction signal, the arithmetic unit 205 shifts to the hold state in which electric current consumption decreases.

When an external operation is detected while the arithmetic unit 205 is in the hold state, the external operation detection circuit 201 supplies an instruction signal for a power supply to the linear system power supply circuit 202. Then, the linear system power supply begins to supply the linear system large load circuit 203. As a result, the state shift signal generating circuit 204 detects the output of the linear system power supply. In the case of this embodiment, there are arranged first and second levels at which the arithmetic unit 205 is to be shifted to the hold state. However, the detection by the circuit 204 may be made on the basis of either the first level or the second level. When the output level is detected to have exceeded the level, the state shift signal generating circuit 204 produces an instruction signal for a shift to an operative state and supplies it to the hold control part 205a of the arithmetic unit 205. This signal brings the unit 205 back to an operative state. An oscillation circuit 206 is then immediately caused to operate. The circuit 206 generates a reference clock signal necessary for control over the linear system large load circuit 203. The linear system large load circuit 203 then begins to perform driving and controlling actions.

The linear system large load circuit 203 includes, for example, a film transport motor driving circuit 203a which is one of large load driving circuits requiring direct control by the arithmetic unit 205 and a flash circuit 203b which is one of large load driving circuits requiring no direct control by the arithmetic unit 205. The details of the circuit 203 are as follows:

In case the arithmetic unit 205 is required to control the motor driving circuit 203a, a signal indicative of this is supplied also to the state shift signal generating circuit 204. Therefore, the state shift signal generating circuit 204 selects, as a shifting level for the hold state, the first level which is lower than the second level for the purpose of preventing the arithmetic unit 205, which is performing control, from being caused to shift to the hold state by a drop of the linear system power supply due to the driving operation of the motor driving circuit 203a. Meanwhile, if the controlled system is the flash circuit 203b which does not require direct control, the state shift signal generating circuit 204 selects, as the shifting level to the hold state, the second level which is higher than the first level. Under this condition, the arithmetic unit 205 immediately shifts to the hold state when the level of the linear system power supply drops due to the driving action on the flash circuit 203b. This arrangement effectively permits adequate power supply backup for the arithmetic unit 205.

The embodiment is thus arranged to change the shifting level to the hold state according to the driven load. The CPU is prevented from being shifted to the hold state by a voltage drop during a driving process when the driven load is driven under the control of the CPU. The CPU is allowed to immediately shift to the hold state in the event of a load which does not have to be driven under the control of the CPU and to be driven over a long period of time. This effectively prevents a backup power supply for the CPU from being consumed during a load driving process and thus prevents stored data from being cleared due to such consumption.

The camera arrangement of the embodiment shown in FIG. 10 is identical with the camera of FIG. 2. The embodiment also comprises a VDD detection circuit 8, an oscillation and clock change-over circuit 9 and a sequence control circuit 10 which are identical with those shown in FIGS. 4, 5 and 6. Therefore, these parts are omitted from the following description. However, in the embodiment shown in FIG. 10, the VCC detection circuit 6 of FIG. 2 is differently arranged as shown in FIG. 11.

Figure 11:
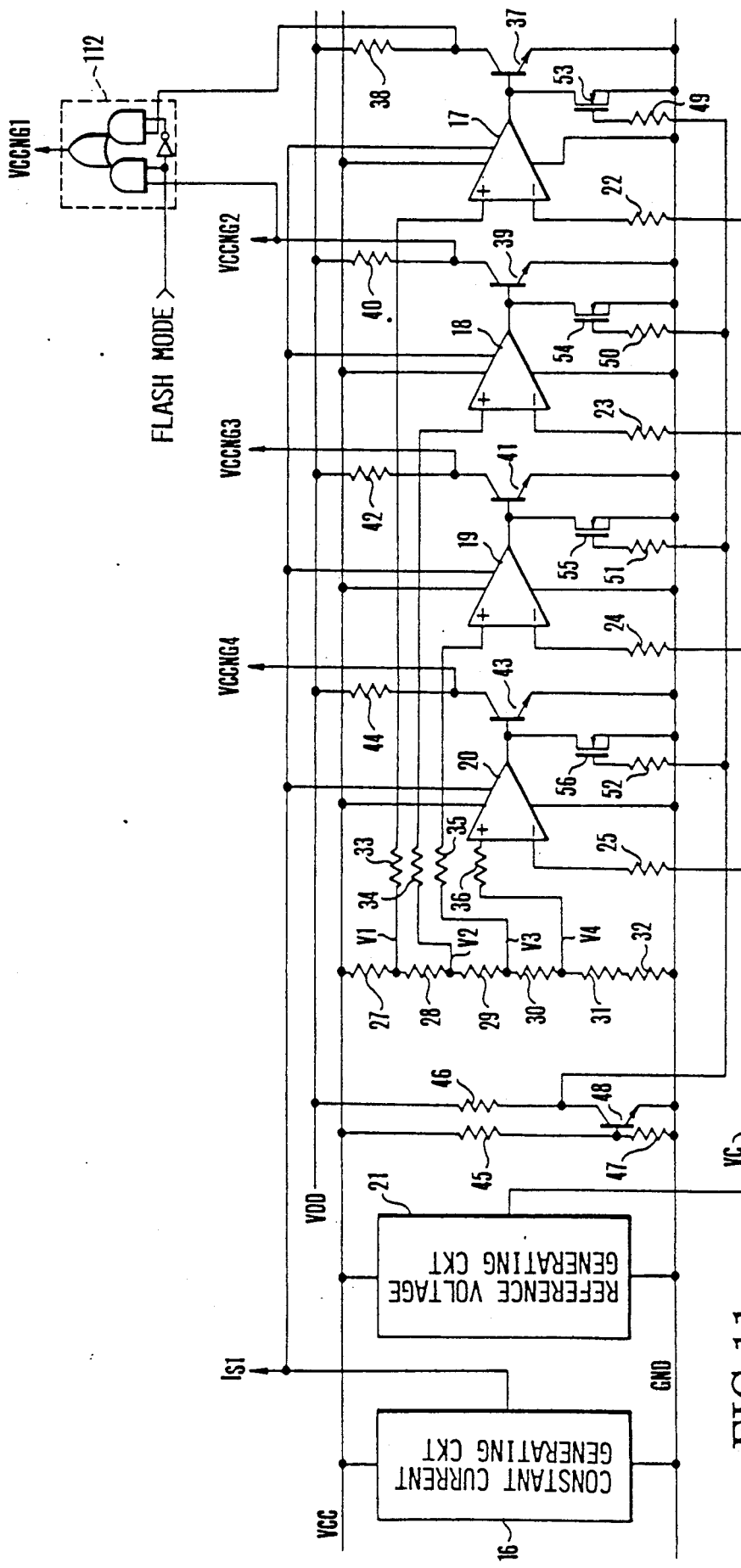
FIG. 11 is a circuit diagram showing the arrangement of a VCC detection circuit included in the embodiment shown in FIG. 10.

In FIG. 11, the same component elements as those of FIG. 3 are indicated by the same reference numerals. Referring to FIG. 11, the VCC detection circuit 6 includes a gate selector circuit 112, which is arranged to select the output VCCNG2 of the comparator 18 as the output VCCNG1 of the circuit 6 when the camera is in a flash mode and to select the output of the comparator 17 as the output VCCNG1 when the camera is not in the flash mode. The operation in the normal mode of the embodiment shown in FIG. 10 is controlled according to the procedures of the flow charts of FIGS. 7 and 8 in the same manner as in the case of the embodiment shown in FIG. 1.

Figure 12A:
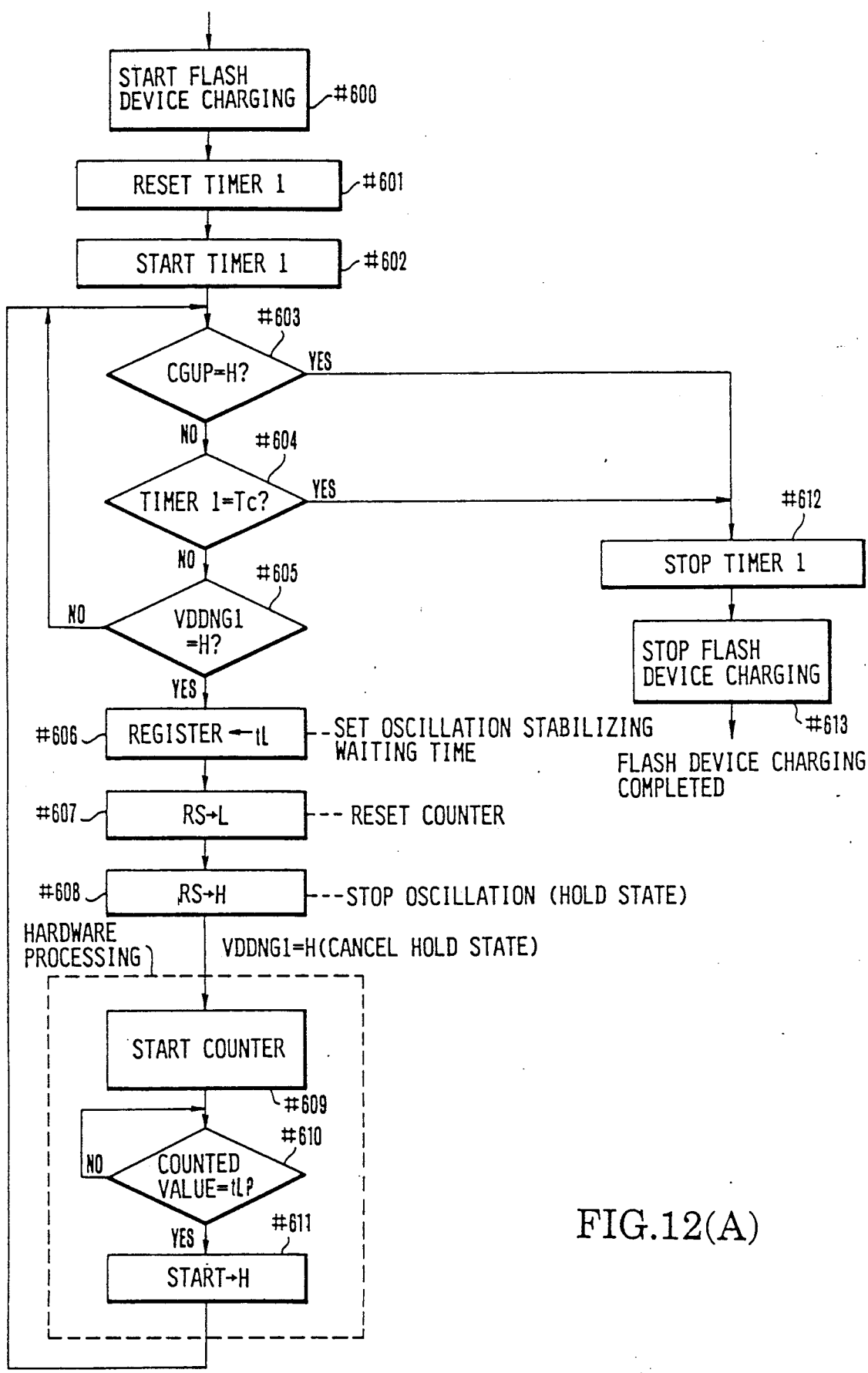
FIGS. 12(A) and 12(B) are flowcharts showing the operation of the embodiment shown in FIG. 10.

In the case of the flash mode, the embodiment operates as follows: FIG. 12(A) is a flowchart showing the operation in the flash mode. The flow of FIG. 12(A) is executed during the flash device charging routine in the flow of FIG. 7. Referring to FIG. 12(A), a flash device charging process begins at a step #600. Then, a main capacitor which is not shown but is included in the flash circuit 111 begins to be charged with electric energy. At a step #601: The value of a timer 1 is reset. At a step #602: The timer 1 is started. At a step #603: A check is made to see if the main capacitor is charged to a given level. Upon completion of charging, the level of an output CGUP (not shown) becomes high. If the output level is found to be high, the flow comes to a step #612. At the step #612: The timer 1 is stopped. At a step #613: The flash device charging process is brought to an end by stopping and controlling it. The flash device charging routine thus comes to an end. In case that the flash device charging process is found not to have been completed at the step #603, the flow comes to a step #604. Step #604: The timer 1 is checked to see if it has reached a value Tc. If so, the flow proceeds to the steps #612 and #613 like in the case of completion of flash device charging. If not, the flow comes to a step #605. At the step #605: A check is made for the state of the output VDDNG1.

The output VCC rapidly decreases when the flash device charging process begins as shown in FIG. 13 which is a timing chart. In the flash mode, therefore, the gate selector circuit 112 selects, as the output VCCNG1, the output VCCNG2 (>VCCNG1). In other words, in the flash mode, a flash mode flag is set at "1" at the beginning of flash device charging at the step #600. The gate selector circuit 112 of FIG. 11 thus selects the output VCCNG2 as the output VCCNG1. As a result, at the VCC detection circuit 6 of FIG. 11, the divided voltage V2 (>V1) which is obtained by voltage-dividing the output VCC becomes lower than the reference voltage VC. The output level of the comparator 18 changes to a low level. The output VCCNG1 (=VCCNG2) becomes a high level through a transistor 39, a resistor 40 and the gate selector circuit 112. Meanwhile, at the VDD detection circuit 8 of FIG.

4, the constant current generating circuit 57 is caused to assume a disabled state via inverters 68 and 78 and MOS transistors 74 and 77 when the level of the output VCCNG1 becomes high. Then, the output currents Is2 and Is3 of the constant current generating circuit 57 is no longer available. As a result, the output level of the comparator 58 becomes high. This causes the level of the output VDDNG1 of the OR gate 70 to become high. When the high level output VDDNG1 is detected at the step #605, the flow of operation immediately proceeds to a step #606. At the step #606: The CPU 100 sets an oscillation stabilizing waiting time "tL" at a register 103. The value of the time "tL" is arranged to be longer than the oscillation stabilizing waiting time "ts" set at the step #518 of FIG. 8 during the period of the SW1 WAIT state in the normal mode described in the foregoing. At a step #607: The level of the output $\overline{RS}$ of the CPU 100 is lowered to reset the RS flip-flop 104. The counter 101 is also reset via an inverter 106. At a step #608: The level of the output $\overline{RS}$ is changed to a high level. Then, the level of the output $\overline{HOSC}$ of the NAND gate 105 becomes low. This brings the operation of the oscillation circuit of FIG. 5 to a stop. The CPU is thus shifted to a hold state for the flash device charging process.

Then, the level of the output VDD which serves as a power supply to the CPU 100 comes to drop the instant the flash device charging process begins. Meanwhile, however, the CPU 100 has a sufficient amount of power supply voltage even when the output VCC has reached a given level, because: The output level of the output VCC drops faster due to current consumption and the reverse transistor effect of the transistor 11. In addition to that, the output VCCNG1 which enables the CPU 100 to be shifted to the hold state is arranged to be also at a high level in the same manner as the output VCCNG2. Besides, the current consumption by the CPU 100 becomes very small when oscillation comes to a stop. Therefore, the CPU 100 can be adequately backed up by means of a backup capacitor 5 even when the output Vbat of the battery 1 drops.

As shown in FIG. 13, when the charged level of the main capacitor reaches a given value through the flash device charging process, the level of the output Vbat comes back to its original level and the level of the output VCC comes to rise. In the case of FIG. 11, the VCC detection circuit 6 is arranged to change the output level of the comparator 18 to a high level when the divided voltage V2 of the output VCC comes to exceed the reference voltage VC. Then, the level of the output VCCNG1 which is obtained via the transistor 39, the resistor 40 and the gate selector circuit 112 becomes low. At the same time, at the VDD detection circuit 8 of FIG. 4, the level of the output VCCNG1 changes to a low level. This brings the constant current generating circuit 57 into an enabled state via the inverters 68 and 78 and the MOS transistors 74 and 77. Further, the MOS transistors 75 and 76 are turned on via inverters 68 and 69. That enables the reference voltage generating circuit 62 and resistors 63 to 67. The output level of the comparator 58 which compares the divided voltage V5 of the output VDD with the output $\Sigma Vth$ of the reference voltage generating circuit 62 becomes low when the level of the output VDD is higher than that value. Then, the level of the output VDDNG1 of the OR gate 70 also becomes low. With the level of the output VDDNG1 thus becoming low, the RS flip-flop 104 of FIG. 6 is set. The level of the $\overline{Q}$ output of the flip-flop 104 then becomes low. The level of the output $\overline{HOSC}$ of the NAND gate 105 changes to a high level. This output causes the oscillation circuit of FIG. 5 to begin to oscillate. The output Xin of the oscillation and clock change-over circuit 9 is then supplied as a clock signal to the CPU 100 and the counter 101. At the same time as the start of oscillation, the level of the output VDD which serves as the power supply for the CPU 100 rapidly drops as shown in FIG. 13. However, in the flash mode, the level of the output VCCNG1 (divided voltage V1) which is to be used as a hold state concelling level in the flash mode is arranged to be at a high level and to be virtually the output VCCNG2 (divided voltage V2). Therefore, the level of the output VDD never becomes lower than an operation warranting voltage for the CPU 100. With the count of the counter 101 progressed, when the counted value reaches the oscillation stabilizing waiting time "tL" set at the register 103, the level of the output START of the comparator 102 becomes high. This output is supplied to the CPU 100 to bring the CPU 100 from an operable state into an operative state. This enables the CPU 100 to begin to execute an ensuing program.

In the flow chart of FIG. 12(A), a part from a step #609 to a step #611 corresponds to a hardware process. The flow of operation comes back to the step #603 to begin making a check for the end of flash device charging process when the level of the output START becomes a high level as mentioned above. Further, when the flash device charging process is stopped at the step #613, the flash mode flag is set at 37 0" and the camera is brought back to a normal photographing mode.

Figure 7:
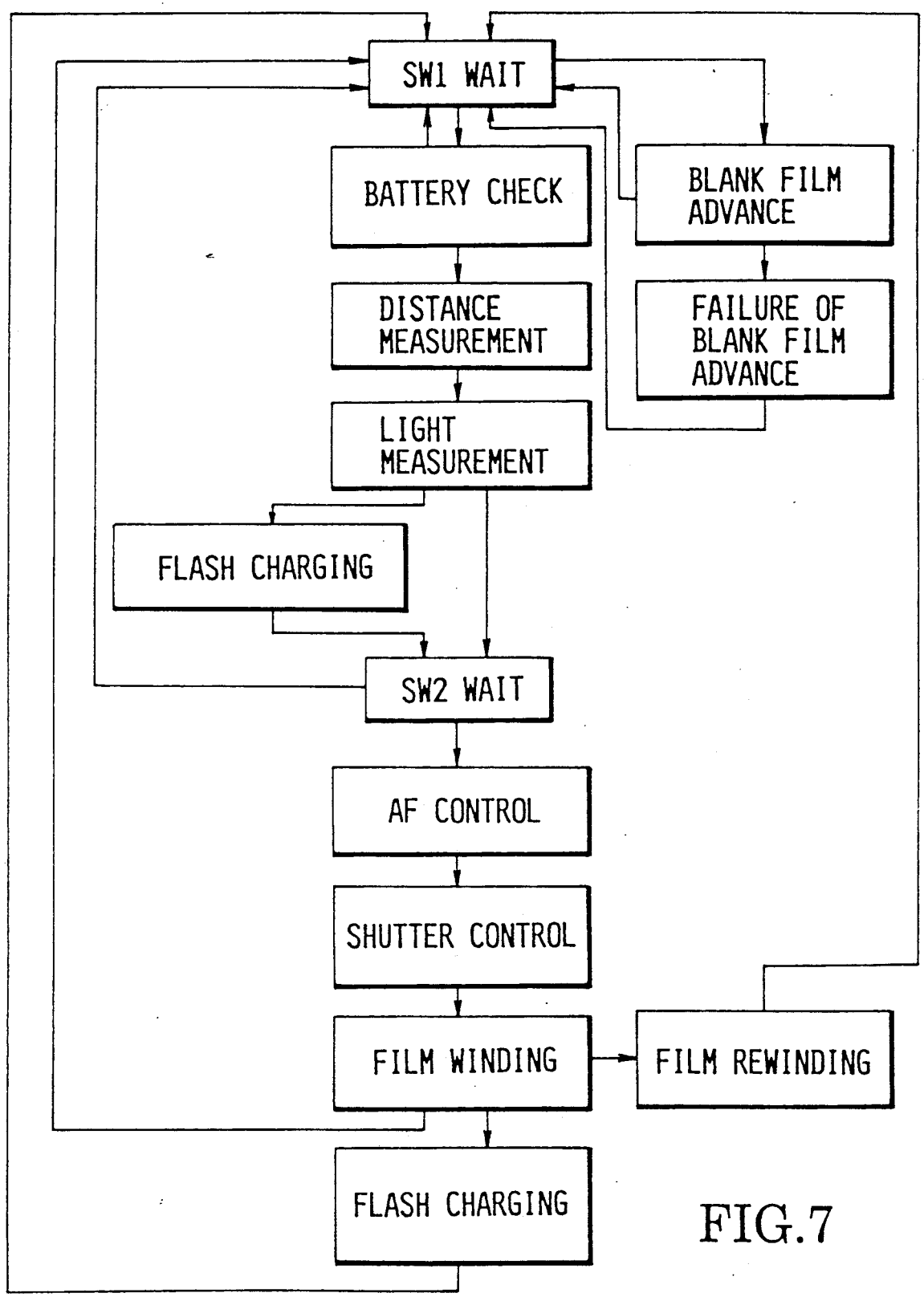
FIG. 7 is a flowchart showing in outline the operation of the camera of FIG. 2 as a whole.
Figure 12B:
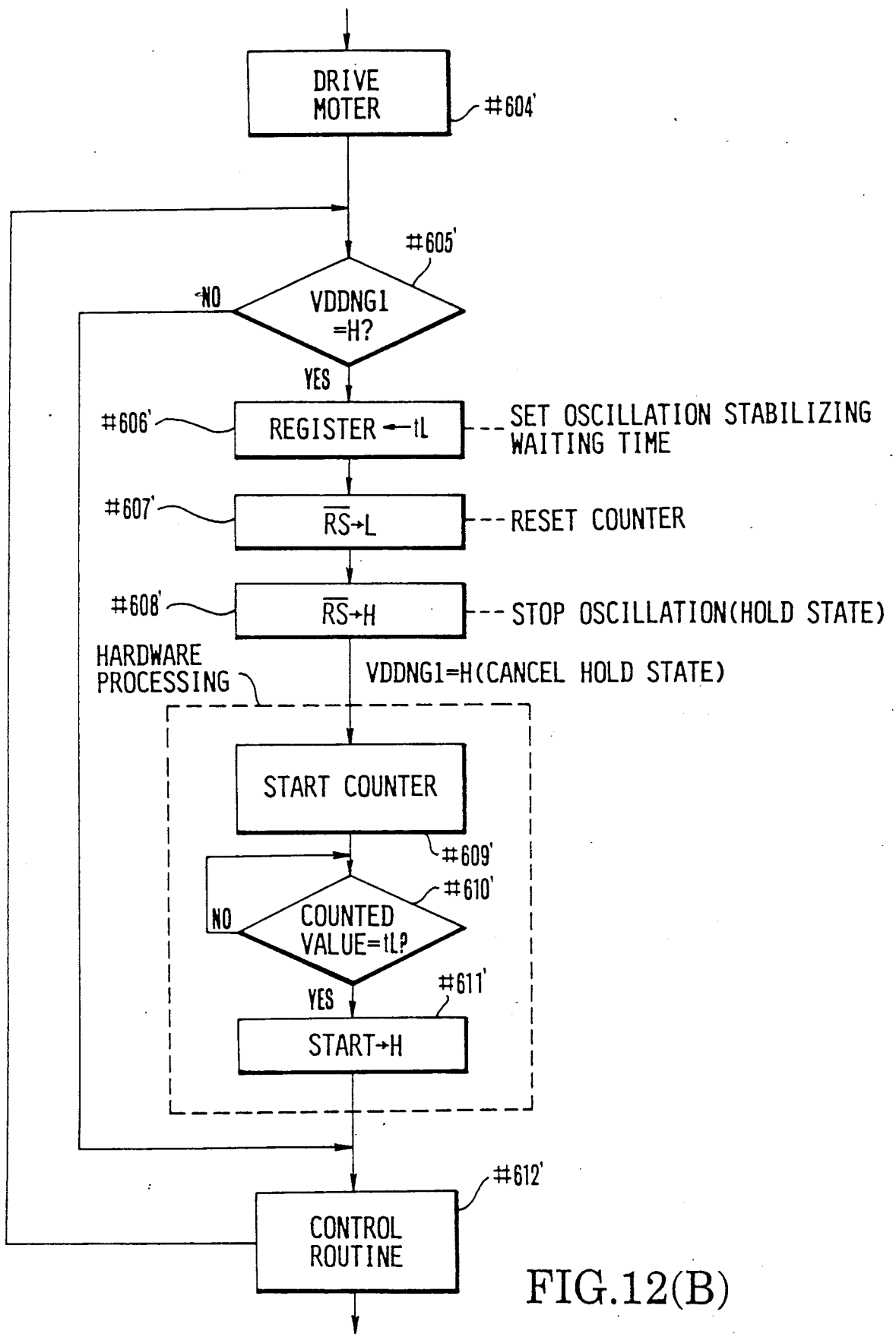

Referring now to FIG. 12(B) which is a flow-chart, the film winding routine included in the flow chart of FIG. 7 is described as follows: In the case of this flow, the motor driving circuit 3 is first started at a step #604'. Following this, steps #605' to #611' are executed. This part of flow is identical with the steps #605 to #611 of the flow chart of FIG. 12(A) and, therefore, requires no detailed description. However, when a power supply voltage drop is detected during a motor driving process, there obtains a hold state. An operative state is obtained after the power supply voltage is regained. Further, unlike the voltage drop detection in the flash mode, the shift to the hold mode is inhibited until the power supply voltage VCC drops to a considerably low level because of the selection of the output of the comparator 17 of FIG. 11.

Further, when the level of the output VDDNG1 is determined to be low (VDDNG1=L) at the step #605', a control routine is executed at a step #612'. Then, a motor driving, control action is performed under the control of the CPU 100 within this routine. The flow comes back to the step #605' during the routine of the step #612' to periodically make a check for the above stated voltage drop. The film winding routine comes to an end when the routine of the step #612' is completed.

As described above, since some load is driven and controlled with the CPU 100 in the routine of FIG. 12(B), the CPU 100 is shifted to the hold state when the CPU 100 becomes inoperative or comes to faultily operate due to some accident or an excessive voltage drop. The CPU 100 is thus arranged to be prevented from being immediately shifted to a hold state by a voltage drop occurring driving a load driving operation under the control of the CPU 100.

In the embodiment, the power supply level at which the CPU 100 is to be shifted to its hold state during a driving and controlling action on a large load, such as a motor driving and control action for film winding or the like, that must be performed under the control of the CPU 100 is set at a low level, which is the level of the voltage V1 obtained by voltage-dividing the output VCC. This arrangement ensures that the CPU 100 will never be shifted to the hold state when the power supply level is lowered by the motor driving action, so that the CPU 100 can be kept in an operating state until the power supply level becomes considerably low. Therefore, normal camera operations can be performed until the battery is consumed to a great degree. Further, in cases where the CPU 100 is not required to perform direct control over a driving and controlling action on a large load such as a flash device charging process, the level at which the CPU 100 is to be shifted to the hold state is set at the divided voltage V2 which is higher than the above stated divided voltage V1. In such a case, therefore, the CPU 100 is allowed to promptly shift to the hold state to ensure low current consumption. This permits reduction in cost obviating the necessity of arranging a battery or the like for backing up the power supply to the CPU 100. The embodiment is, therefore, highly advantageous in terms of cost and space.

In the foregoing, the embodiment is described with a flash device charging process taken up as an example of a large load driving, controlling operation which requires no direct control by the CPU 100 and permits setting a high level at which the CPU 100 is to be shifted to the hold state. However, the invention is not limited to this arrangement. For example, the same advantageous effect is attainable with the embodiment arranged to have the low hold-state selecting level only in the event of driving and controlling a large load which must be controlled directly by the CPU 100.

Further, in the case of the embodiment, the oscillation stabilizing waiting time "ts" which is required in cancelling the hold state under the SW1 WAIT condition in the normal photographing mode and the oscillation stabilizing waiting time "tL" required in cancelling the hold state in the flash mode are arranged to be in a relation of tL>ts. This arrangement enables the CPU 100 to be brought to an adequately operable state even in cases where a long period of time is necessary before an oscillating state comes to settle down after cancellation of the hold state and commencement of oscillation with the power supply output greatly dropped like in the case of flash mode. Further, the arrangement to have the time "ts" for the normal photographing mode set at a value smaller than the time "tL" enables the CPU 100 to be promptly shifted to an operative state.

Further, as another embodiment of the invention, a camera may be arranged to have the level for shifting from the operative state to the hold state and the level for shifting from the hold state to the operative state coincide with each other, either in the ordinary mode or in the flash mode. In this instance, the embodiment is arranged as shown in FIG. 1. The flow of control operation is arranged similarly to FIGS. 7 and 8 or to the flow of FIG. 12 of the embodiment shown in FIG. 10. In the latter case, the flash mode flag setting at "1" and at "37 0" at the steps #600 and #613 is omitted.

Figure 14:
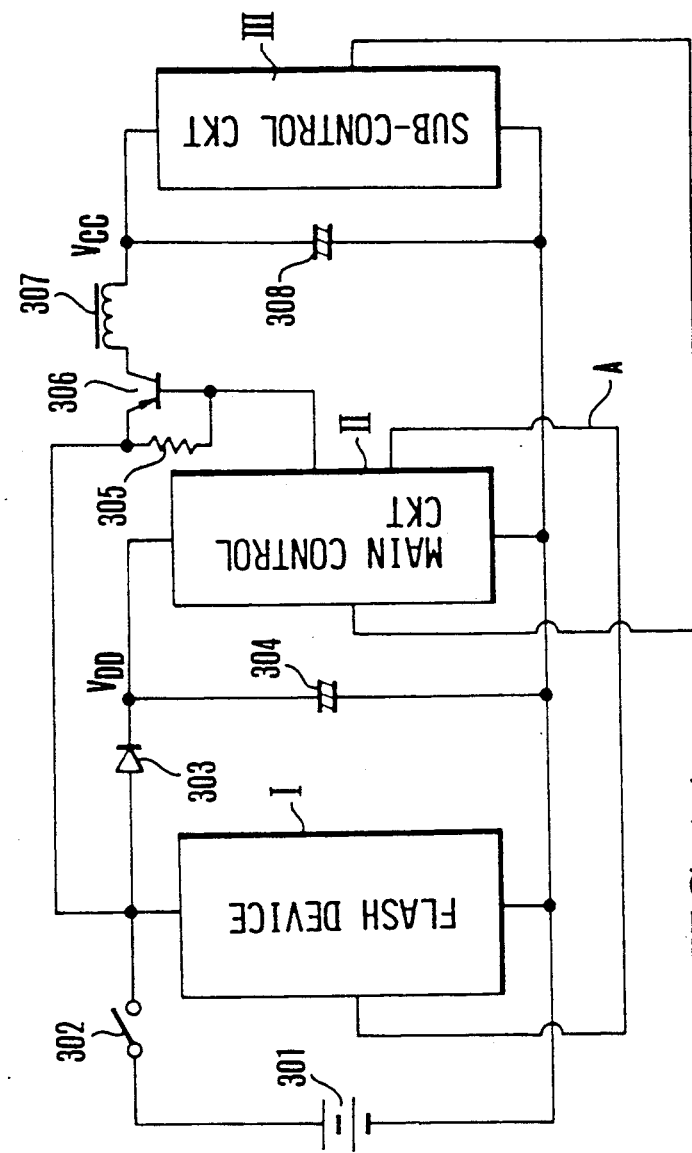
FIG. 14 is a circuit diagram showing a camera arranged as a further embodiment of the invention.

FIG. 14 is a block diagram showing a camera arranged as a further embodiment of this invention. In this case, the camera is arranged to be in an hold state only when the camera is shifted to a flash mode.

Referring to FIG. 14, the illustration includes a battery 301 which is employed as a power source; and a power supply switch 302. A block I denotes the circuit block of a flash device. A block II denotes a main control circuit which is provided for driving the camera and includes a microcomputer as a circuit element. A block III denotes circuit arrangement including a voltage detection circuit and other sub-control circuits.

The block II is connected to a backup capacitor 304 which is in turn connected via a diode 303 to the power source battery 301 and is arranged to ensure low energy consuming operation of a control circuit. The block III is connected to a filter capacitor 308 which is connected to the power source 301 via a transistor 306 and a choke coil 307 forming a filter circuit.

Figure 16:
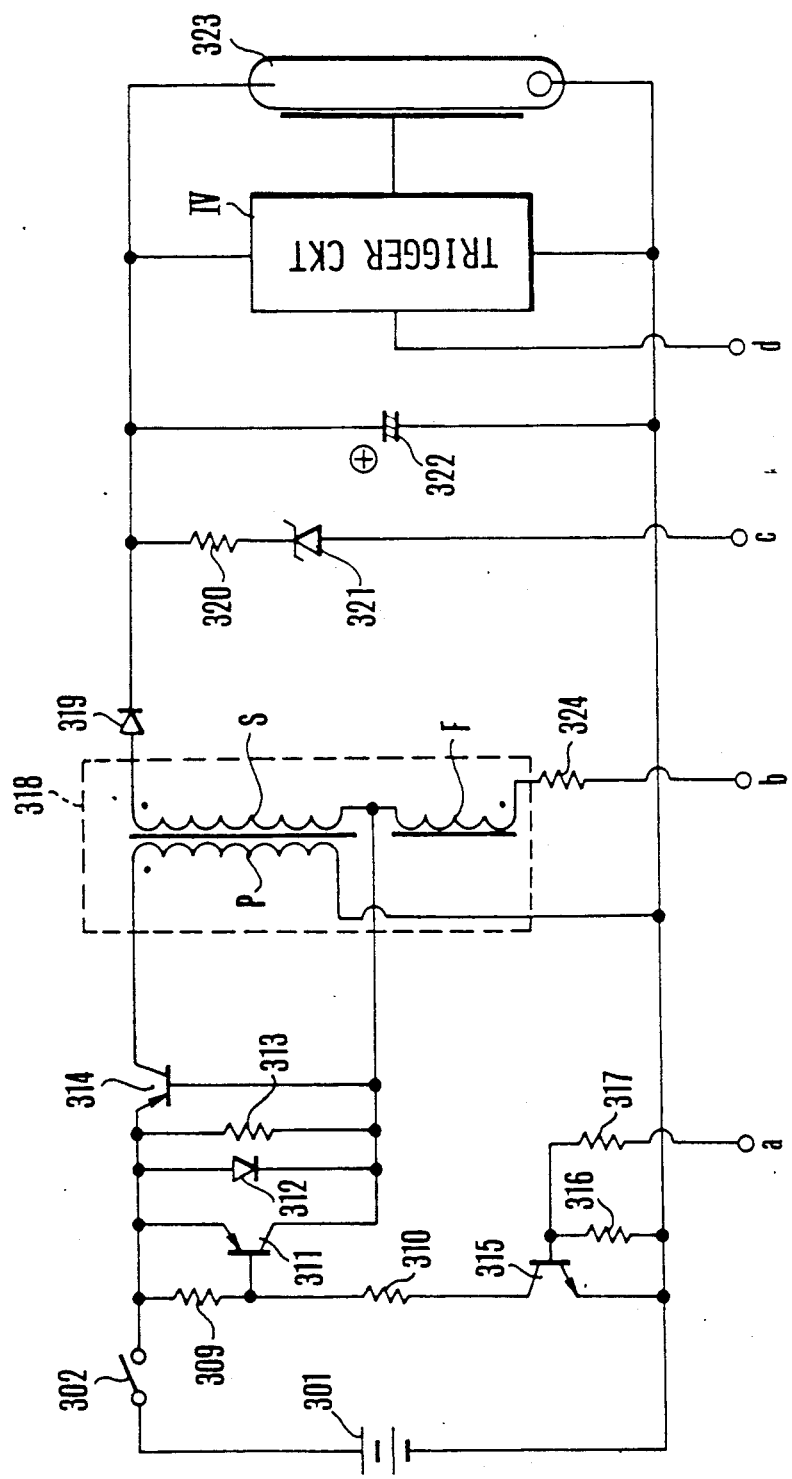
FIG. 16 is a circuit diagram showing the circuit arrangement of a flash device included in the embodiment shown in FIG. 14.

The arrangement of the details of these circuit blocks and circuit operation are as follows: When the power supply switch 302 which serves as the main switch of the camera is closed, a power supply is effected to the blocks I and II. The flash device of the block I is arranged to perform oscillation starting and stopping actions and a flashing action under the control of the block II by receiving a control signal from a signal terminal A of the block II. The control signal from the signal terminal A is arranged to be produced when flashing is required at the time of shutter release of the camera. The details of the flash device are as shown in FIG. 16 and are arranged in the same manner as a known flash device. Therefore, the arrangement of the flash device is only briefly described here. Further, in FIG. 16, reference numerals 301 and 302 denote the same elements as those shown in FIG. 14.

Referring to FIG. 16, the block I is provided with signal terminals a to d which are interconnected with a microcomputer (not shown) disposed within the block II. The terminal b is arranged to be at a low level when the terminal a is at a low level. Then, a start signal is applied to a DC-DC converter 318 via the base-emitter of a transistor 314 and a resistor 324. Oscillation begins in response to this signal.

A main capacitor 322 is charged and the voltage thereof is gradually raised by this oscillation. When the voltage raised by the charging action comes to exceed a given value, a Zener current flows to a high voltage Zener diode 321. As a result, a charging completion signal is applied, via the terminal c, to the microcomputer of the block II by a current detection circuit disposed within the block III. Upon receipt of this charging completion signal, the microcomputer causes the terminal a to be at a high level and the terminal b to be in an open state.

As a result, the transistor 311 short-circuits between the base and emitter of the oscillating transistor 314. This bring the above stated oscillation to a stop. Further, since the terminal b is open, the above stated start signal is not allowed to flow so that the flash device can be kept in the state of having the oscillation stopped even when the signal of the terminal a comes to a stop. The terminal d is connected to a block IV which is a trigger circuit and is arranged to cause the flash device to begin to operate. The terminal d is thus arranged to cause a discharge tube 323 to flash by receiving a flashing signal from the microcomputer disposed within the block II which is a control circuit.

The block II which incorporates therein the microcomputer as a circuit element as mentioned above is arranged to effect a power supply to the block III by rendering a transistor 306 conductive when a shutter release button of the camera which is not shown is pushed. Upon receipt of the power supply, the block III detects necessary information by means of an exposure information detection circuit, a measured distance information detection circuit, etc. and supplies the microcomputer of the block II with an information signal indicating the result of detection. Upon receipt of the necessary information, the block II performs a computing and processing operation for control over each of the devices provided for photographing. The camera is thus caused to perform a photographing operation in accordance with predetermined procedures.

In this instance, if the use of the flash device is found to be not necessary through the computation, etc. performed on the basis of exposure (light measuring) information, no signal is supplied to the terminal b of the block I. However, if the use of the flash device is determined to be necessary, a signal (i.e. an oscillation start signal for the flash device) is produced via the control terminal A to make the level of the terminal b of the block I low as mentioned in the foregoing.

When the flash device begins to oscillate in response to this oscillation start signal, the voltage of the power source battery 301 rapidly drops for charging the main capacitor 322 disposed within the flash device. As a result, the main control circuit which is the block II becomes no longer operable relying upon the power supply from the power source battery and thus comes to rely upon the backup capacitor 304. The operation of the main control circuit in reliance on the backup capacitor 304 is arranged, in this case, to be performed in a hold state which assures reliable reservation of information at storage elements within the microcomputer.

The change-over of operation from a normal state to the hold state is arranged to be caused by a signal produced from a voltage detection circuit which is arranged to detect a voltage drop of the power source battery 301 as will be further described later. Upon receipt of this signal, the microcomputer securely stores necessary data in its memory before it assumes the hold state.

The block III includes a voltage detection circuit as well as a control circuit which is not shown but is arranged to perform light and distance measurement for the camera. As mentioned in the foregoing, the power supply to the block III is controlled by the block II via the transistor 306 which is shown in FIG. 14.

Figure 17:
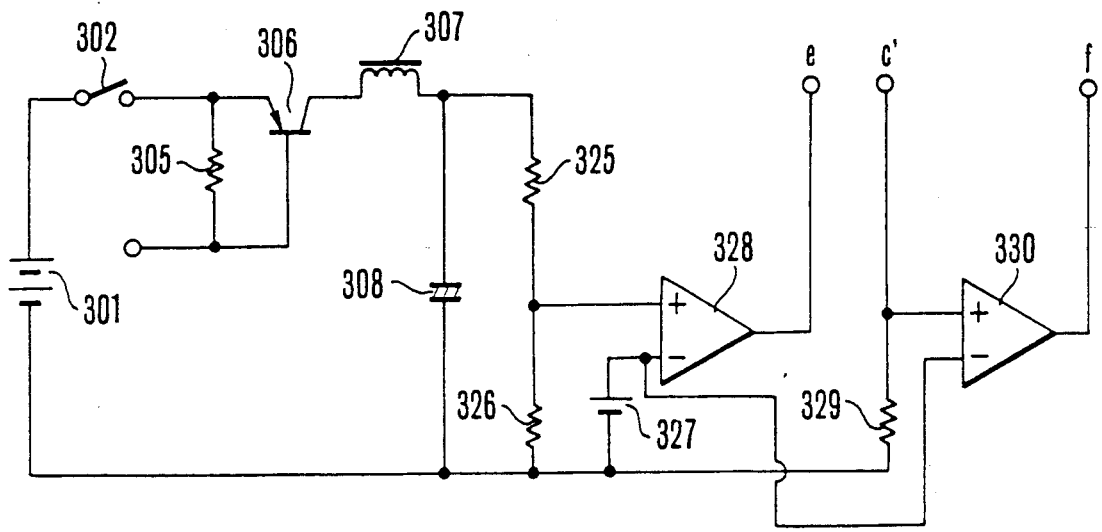
FIG. 17 is a circuit diagram showing the arrangement of a voltage detection circuit included in the embodiment shown in FIG. 14.

FIG. 17 shows the details of the above stated voltage detection circuit arranged within the block III. In FIG. 17, reference numerals 301, 302, 305, 306, 307 and 308 denote the same elements indicated by the same numerals in FIG. 14. Referring to FIG. 17, a comparator 328 is arranged to detect and determine whether the voltage level of the capacitor 308 has exceeded a given value. One input terminal of the comparator 328 is connected to a reference voltage source 327 while the other input terminal is arranged to detect the level of a divided voltage obtained via resistors 325 and 326 from the voltage of the capacitor 308. A terminal c' is connected to the terminal c of the block I of FIG. 16 and is provided for detection of charge completion signal indicating completion of a flash device charging process.

The resistors 325 and 326 are set in relation to the reference voltage 327 at such a voltage value that ensures a minimum operating voltage VDD for the normal operation of the microcomputer disposed within the block II. Therefore, when the voltage of the power source battery which is dropped due to a charging action on the main capacitor 322 of the flash device gradually recovers and comes to exceed the above stated set voltage value, the comparator 328 detects it and produces a hold mode cancellation signal for the microcomputer of the block II. Then, the cancellation signal is supplied to the main control circuit of the block II. Upon receipt of this signal, the microcomputer is released from the hold mode (or state) to assume a normal operative state. The microcomputer thus becomes ready for a flash device charging completion signal.

When the flash device charging completion signal is generated at a resistor 329, a comparator 330 detects it. The output of the comparator 330 is inverted to give the charging completion signal via a terminal f to the microcomputer of the block II. Upon receipt of the charging completion signal, the microcomputer supplies a high level signal to the terminal a of FIG. 16 and also opens the terminal b to bring the oscillation of the flash device to a stop as mentioned in the foregoing. The terminal a is opened after the oscillation comes to a stop. Under this condition, the terminal b is also open to inhibit oscillation.

Figure 15A:
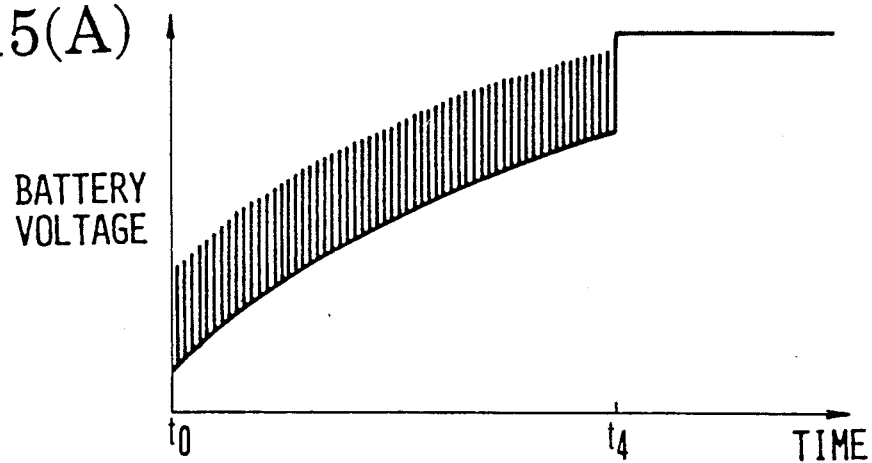
FIGS. 15(A), 15(B) and 15(C) show voltage wave forms obtained at the various parts of the embodiment shown in FIG. 14.
Figure 15B:
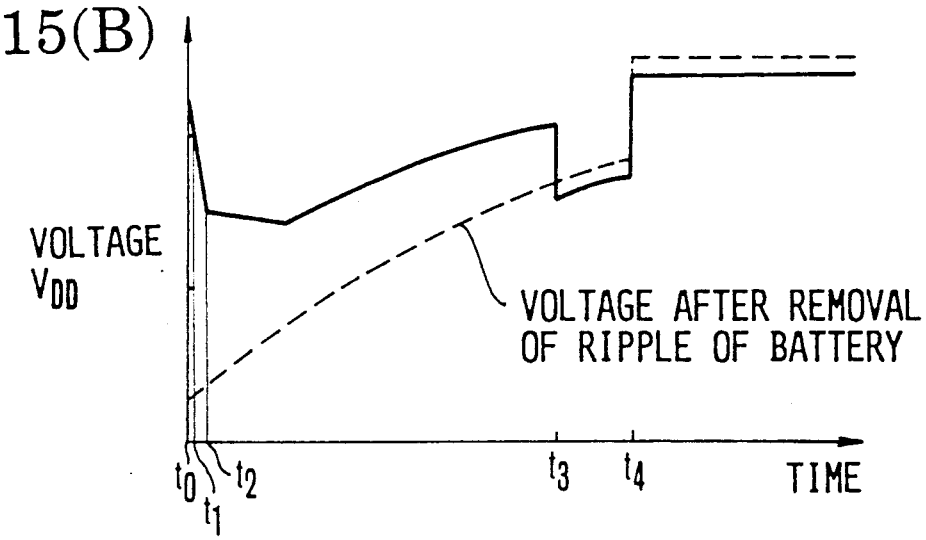
Figure 15C:
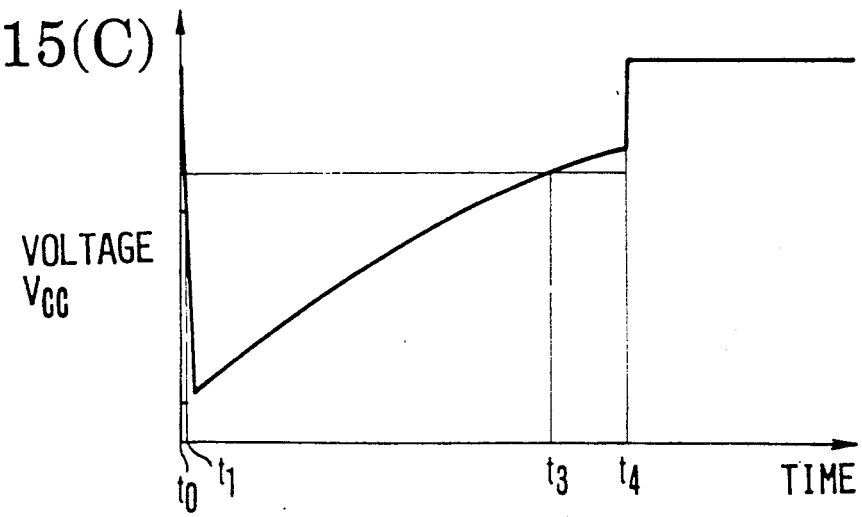

FIGS. 15(a), 15(b) and 15(c) show the voltage wave forms of the power supplies, i.e. the voltage of the power source battery 301, the voltage $V_{DD}$ of power supply to the block II and the voltage $V_{CC}$ of power supply to the block III, obtained following the operation of the circuit arrangement of FIG. 14. Referring to these drawings, in case that the flash device must be used for photographing, the DC-DC converter 318 of the flash device first comes to operate at a point of time t0. This causes a rapid drop in the voltage of the power source battery 301. At this time, since the DC-DC converter 318 of the flash device is operating as mentioned above, a ripple is produced in the voltage of the power source battery 301 in synchronism with the on and off actions of an oscillating transistor, as shown in FIG. 15(a).

The voltage of the power source battery 301 comes to drop accordingly as the main capacitor 322 of the flash device is charged. This causes the voltage of the power supply to the blocks II and III to decrease. After that the power supply voltage $V_{DD}$ of the block II is backed up by backup capacitor 304 for the processing operation of the microcomputer following the generation of a charging start signal and for the process of shifting to the hold state. When a drop in the battery voltage is detected at a point of time t1, the process of shifting the microcomputer to the hold state is carried out during a period before another point of time t2. The hold state of the microcomputer is obtained at the point of time t2.

When the hold state is obtained at the time point t2, the capacity of the above stated backup is increased. Further, the voltage of the power source battery 301 comes to gradually increase, with the ripple component still included therein, accordingly as the charging process on the main capacitor 322 progresses. The ripple component is smoothed by a diode 303 and the voltage $V_{DD}$ of the capacitor 304 rises as shown in FIG. 15(b). The voltage $V_{CC}$ of the power supply to the block III has its ripple component removed by a filter circuit formed by a choke coil and a capacitor 308. The voltage Vcc then temporarily rises to a potential including almost no ripple component, as shown in FIG. 15(c). When the voltage $V_{CC}$ reaches a given detection level, a hold cancellation signal for releasing the microcomputer of the block II from the hold state is produced as mentioned in the foregoing. This brings the microcomputer out of the hold state into a standby state in which it is ready for receiving the flash device charging completion signal.

With the charging process on the flash device having progressed, when the charging completion signal is supplied to the microcomputer of the block II upon completion of the charging process, the microcomputer then causes the flash device to stop oscillating to ensure the minimum operating voltage for the charging period of the flash device.

Figure 18:
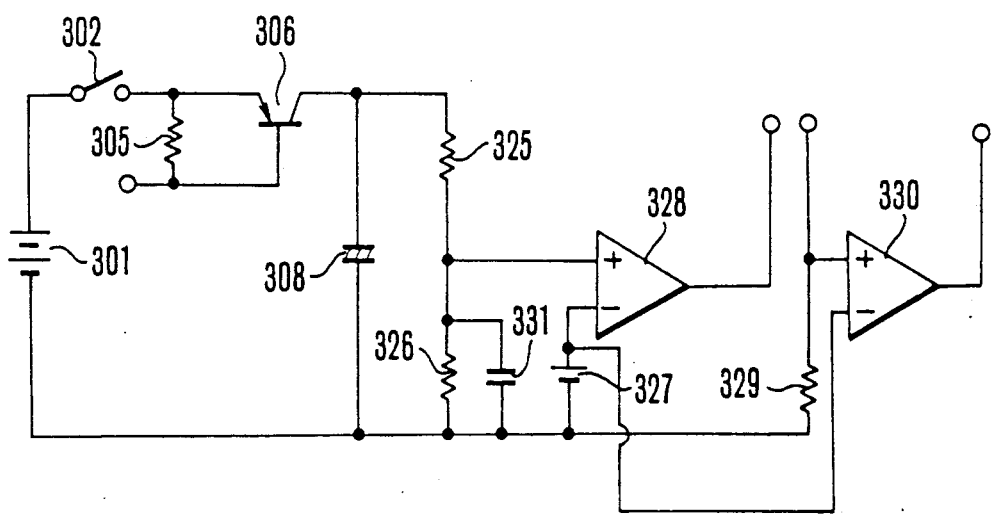
FIG. 18 is a circuit diagram showing another example of arrangement of the same voltage detection circuit.

The voltage detection circuit of the block III which is arranged as shown in FIG. 17 may be replaced with a circuit arrangement as shown in FIG. 18. In the case of FIG. 18, another capacitor 331 is connected to the detection terminal of the comparator 328.

Figure 19:
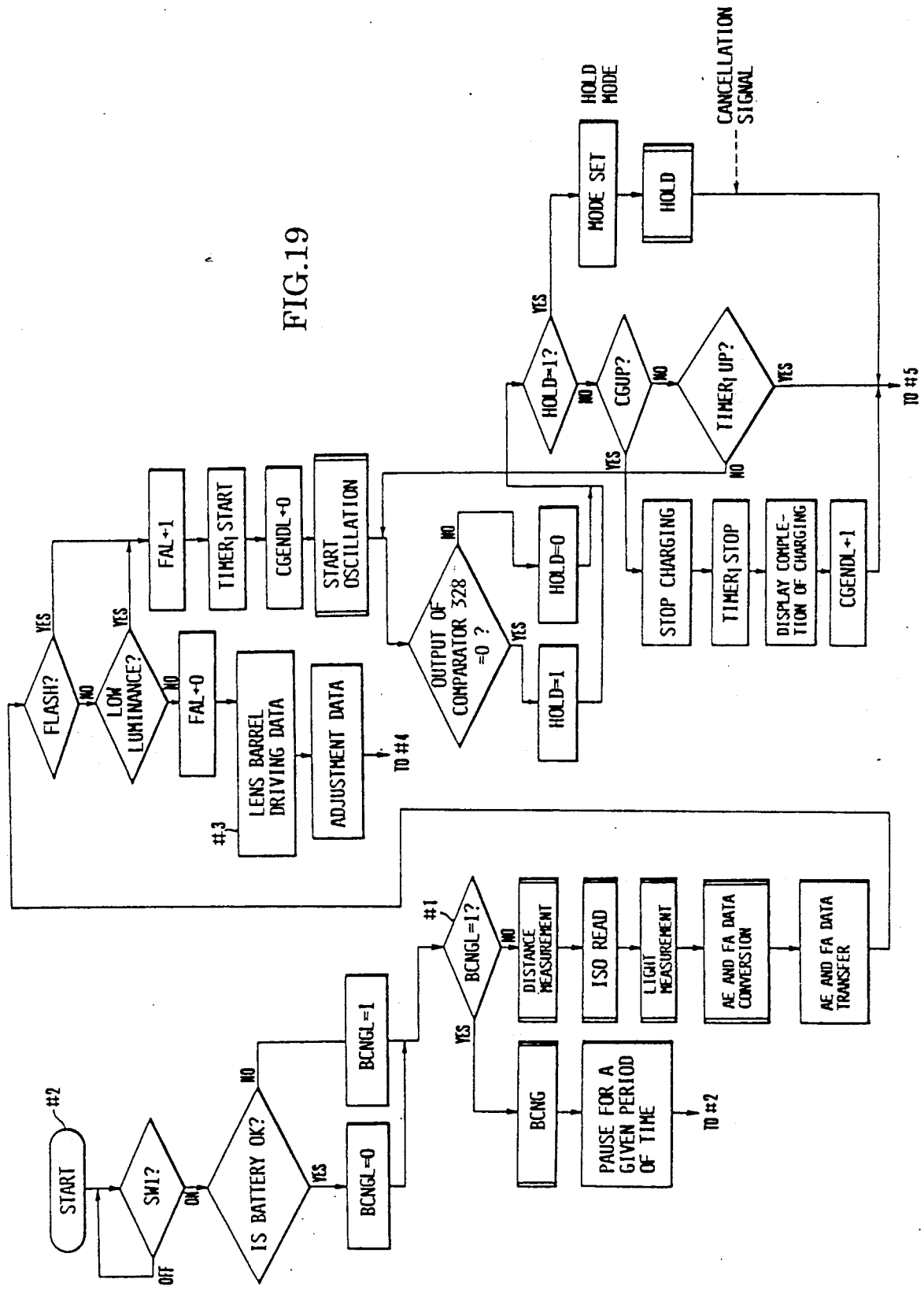
FIGS. 19 and 20 are flowcharts respectively showing the operation of the embodiment shown in FIG. 14.
Figure 20:
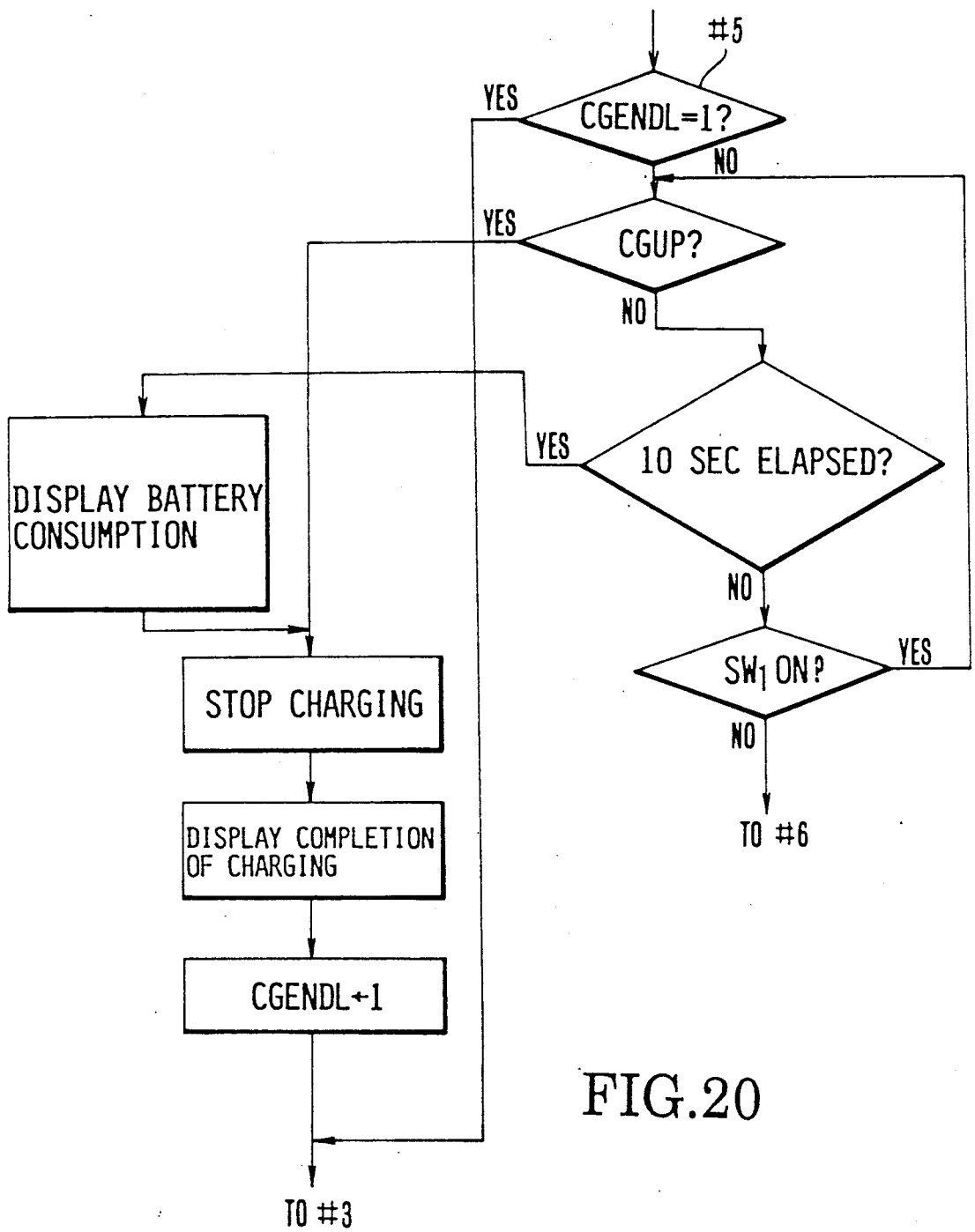

FIGS. 19 and 20 are flowcharts showing the operation of the microcomputer included in the block II of the embodiment described above. When the power supply switch 302 of FIG. 14 is closed, the power supply is effected to each of the blocks including the camera control circuit. The microcomputer which is disposed within the camera control circuit (block II) is then rendered operative. The microcomputer initializes data and comes to be in a standby mode waiting for a first (half) stroke of operation on a shutter release button. When it is detected that a switch SW1 which is not shown is turned on by the first stroke of the shutter release button, the condition of the battery is checked to find if the sequence of operations of the camera can be carried out. If so, a BCNG latch is reset. If not, data "1" is stored at the BCNG latch. The condition of the battery is arranged to be detected by a battery check circuit which is not shown. The battery check circuit is arranged to inform the microcomputer of the voltage level of the battery relative to a given value. In case that the capacity of the battery is found to be insufficient for the sequence of camera operations, the BCNG latch is at "1". In this case, the flow of operation of the microcomputer enters into the routine of the BCNG latch and resumes its initial state after making a pause for a given period of time. If the BCNG latch is at 37 0", a distance measuring circuit which is not shown but is disposed within the block III is first allowed to perform a distance measuring action. Next, data on film sensitivity which is either indicated by a DX code or manually set is read out. Then, a light measuring circuit which is not shown but is disposed within the block III is allowed to perform a light measuring action. Data obtained by these actions is supplied to the microcomputer and is subjected to a data converting operation which is carried out in accordance with a given photographic formula to obtain light measuring data based on measured distance and film sensitivity information. This data is stored in a memory. Next, a check is made for a flash mode or, for example, the on- or off-state of a manual-operation switch which is not shown. If the switch is found to be in the on-state thus indicating a forced selection of the flash mode, the flow of operation branches. In case that the selection of the flash-device-using mode is to be found not by detecting the position of the switch, the flow is arranged to make the above-stated branching after confirmation of a low degree of the brightness of an object to be photographed from the above stated data obtained by light measurement. Further, in the case of the flow of FIG. 19, the use of the flash device is arranged to be determined either by checking the flash switch for the forced selection of the flash mode or by detecting the low brightness of the object. If the flow is caused to branch out either by the forced selection of the flash mode or by the detection of a low degree of brightness, data "1" is stored at an FA latch to indicate selection of the flash mode. Following that, the timer 1 is started. The timer 1 is arranged to give a gate time for the purpose of preventing the microcomputer from shifting to the hold mode when the flash device has already been charged. The voltage of the battery rapidly drops when a flash device charging process begins. However, it does not drop much in cases where the flash device has already been charged or where there is a high residual voltage. In such a case, therefore, the microcomputer does not have to be shifted to the hold state. The battery voltage reaches the lowest potential after the lapse of several msec from the start point of the oscillation of the flash device. In view of this, the embodiment is provided with a timer for counting a length of time between ten odd msec and several hundreds of msec. The microcomputer is not shifted to the hold mode (or state) if no signal is produced from the voltage detection circuit during the operating period of the timer. After commencement of the operation of the timer 1, data 37 0" is supplied to a CGEND (charge end) latch, which is arranged to indicate a charging action completed state when it is at "1" and to indicate that the charging action is in process when it is at 37 0". With the charge-end latch (CGENDL) thus reset, the oscillating state of the flash device is set. This is a routine for setting the terminals a and b of FIG. 16. The terminal a is either opened or set at a low level. The terminal b is shortcircuited to the ground by means of a switching element which is not shown. This action causes the flash device to begin to oscillate. Next, the comparator 328 of the voltage detection circuit of FIG. 17 is checked for a low output thereof indicating a drop of the battery voltage to a level lower than a given voltage. If the low level output of the comparator 328 is detected, the hold terminal HOLD of the microcomputer is set at "1" and the flow of operation branches out to enter into a hold mode routine. In the hold mode routine, necessary data being processed by the microcomputer is stored in a memory, i.e. a RAM, which is disposed within the microcomputer before the microcomputer comes into the hold state. Under this condition, the program of the flow pauses. With the flash device charged, when the battery voltage comes back to a given voltage level required for operating the microcomputer, the comparator 328 of the voltage detection circuit of FIG. 17 produces a hold cancellation signal (a high level output). This signal brings the microcomputer back to its operative state. The program which has been at a pause is then resumed. In case that no hold signal is produced over a given period of time after the start of oscillation of the flash device, the flow branches either when the time of the timer 1 is counted up or the charging completion signal is obtained. The flow branches to a routine #5 in the case of the former. In the event of the latter, the flash charging control terminals a and b are set at a charging action stopping state. Further, the completion of the charging action is detected by a high level output of the comparator 330 of FIG. 17 as mentioned in the foregoing. Upon detection of completion of the charging action, the microcomputer gives a high level signal to the terminal a of FIG. 16 and causes the terminal b to open. The timer 1 is stopped from operating and a display is made to indicate the end of the charging action. After that, data "1" is supplied to the charge end latch CGENDL. The flow then proceeds to the routine #5.

FIG. 20 is a flowchart showing the ensuing steps of the flow. In the case of the program of FIG. 20, the battery consumption is arranged to be displayed when a long period of time is required in charging the flash device after the return of the microcomputer to its operative state with the flash device charging process having progressed. The flow of program from the routine #5 comes to variously branch out according to a case where the flash charging process is completed during the operation of the timer 1, a case where the time of the timer 1 is counted up without a shift to the hold state and a case where the microcomputer returns from the hold state. In the case where the charging process is completed during the operation of the timer 1, the charge-end latch CGENDL is at "1". The program then proceeds to a routine #3. In other cases, however, the flow of program differently branches according to a case where the flash device charging process is not completed after the lapse of a given period of time and another case where the charging process is completed within the given period of time. The above stated period of time is, in this instance, set at 10 sec. However, this period of time may be set at a different value as desired. In case that the charging process is found to be completed within 10 sec through the output of the comparator 330 of FIG. 17 as mentioned above after the return of the microcomputer, the microcomputer performs a flash device charging action ending action on the terminal in the same manner as the described in the foregoing. After that, a display is made to show completion of the flash device charging process. The charge-end latch is set at "1" to store the charging action ending state. If the charging completion signal is not generated after the lapse of 10 sec, a display is made to show the degree of consumption of the battery. After that, the charging completion process is performed in the same manner as described in the foregoing. The flow then comes to the routine #3. In the routine #3, the program comes back to the flow of FIG. 19 to perform a computing operation on lens barrel driving data on the basis of the measured distance data, etc. Further, adjustment data is read into the microcomputer. The flow then proceeds to the routine #4 to wait for the second (half) stroke of operation to be performed on the shutter release button. A routine #6 is a routine to be executed in case that the shutter release button is released from the first half stroke of operation before the end of the charging process. In this instance, the flow of the program comes back to the standby mode of waiting for the first stroke of operation on the shutter release button through a flash device charging routine which is not shown. As described above, a point of time at which the microcomputer is to be brought back to its normal operative state and a point of time at which the flash device charging process is completed are both arranged to be detected depending on the voltage level of the power source battery. Further, the time interval between these two points of time is approximately proportional to the consumed state of the battery in use. In view of time, it is possible to detect the consumed state of the power source battery and to give a warning as necessary by presetting the above-stated time of the timer.

In the embodiment described above, the microcomputer which is employed as a control circuit having a storage element is arranged to have a stop mode and a hold mode. These modes are utilized for lowering electric energy consumption. This permits reduction in the capacity of the backup capacitor.

Further, the point of time at which the microcomputer comes back to the normal operating state and the point of time at which the flash device charging process is completed are both arranged to be detected through the voltage level of the power source battery. The time interval between these two points of time is approximately proportional to the consumed state of the power source battery. In view of this, the embodiment is arranged to be capable of detecting the consumed state of the power source battery and giving a warning as necessary by counting the above stated time interval from the point of time at which the microcomputer comes back to its normal operative state.

What is claimed is:

1. A camera having a computer for controlling an operation of a first load circuit, comprising:
   a) a second load circuit;
   b) a power supply circuit for supplying a power to said first load circuit and/or said second load circuit; and
   c) a detection circuit for detecting a drop in a voltage level of power supply effected by said power supply circuit, said detection circuit having a first detection level which is used when said first load circuit is driven and a second detection level which is higher than said first level; and
   d) a switching circuit arranged to shift said computer from a normal operating mode to a low electric energy consuming mode in response to an output of said detection circuit produced when said voltage level is detected to have become lower than said first detection level while said first load circuit is driven or when said voltage level is detected to have become lower than said second detection level while said second load circuit is driven.

2. A camera according to claim 1, wherein said low electric energy consuming mode is a hold mode.

3. A camera according to claim 1, wherein said detection circuit includes a setting circuit for setting a detection level of said detection circuit at said second detection level when said first load circuit is in a non-driven state, and wherein said computer is shifted to said low electric energy consuming mode when said voltage level becomes lower than said second detection level while said second load circuit is driven.

4. A camera according to claim 3, wherein said second load circuit is arranged to perform at least part of operations independently of a control of said computer.

5. A camera having a computer and operating under the control of said computer, comprising:
   a) a plurality of load circuits arranged to have an electric power supply from a power supply circuit;
   b) a switching circuit arranged to detect a drop in a voltage level of power supply to said load circuits being driven and to shift said computer from a normal mode to a low electric energy consuming mode when said voltage level is detected to have become lower than a given value;
   c) a setting circuit arranged to set said given value at one of a first level and a second level which is higher than said first level; and
   d) a change-over circuit arranged to change said first and second levels set by said setting circuit from one over to another according to an operation of the camera.

6. A camera having a computer and operating under the control of said computer, comprising:
   a) an oscillation circuit arranged to supply a clock signal for an operation of said computer;
   b) an operation control circuit arranged to render said oscillation circuit operative and to cause said computer to operate a given period of time after said oscillation circuit begins to operate;
   c) a first load circuit; and
   d) a setting circuit for setting said given period of time at one of a first period of time and a second period of time which is longer than said first period of time, said setting circuit being arranged to set said second period of time when said first load circuit is being driven.

7. A camera according to claim 6, wherein said operation control circuit includes a counter which performs a counting action in response to said clock signal produced from said oscillation circuit and a count detection circuit which produces a signal for actuating said computer when said counter reaches a given count state, and wherein said setting circuit is arranged to set said given count state at one of a first count state value which corresponds to said first period of time and a second count state value which corresponds to said second period of time.

8. A camera according to claim 7, further comprising a voltage detection circuit arranged to detect an output level of a power supply circuit of the camera and to produce an output when said output level changes from a low level to a level exceeding a first level, said oscillation circuit being arranged to begin to operate in response to said output of said voltage detection circuit.

9. A camera according to claim 8, wherein said first load circuit is a flash circuit, said camera further comprising load circuits other than said first load circuit.

10. A camera having a computer and operating under the control of said computer, comprising:
   a) a flash circuit; and
   b) a switching circuit arranged to shift a state of said computer from a normal mode to a low electric energy consuming mode when a charging action is performed on a main capacitor of said flash circuit, to detect an output level of power supply during said charging action and to shift said computer to said normal mode when said output level comes to exceed a given level.

11. A camera according to claim 10, wherein said low electric energy consuming mode is a hold mode.

12. A camera according to claim 11, wherein said switching circuit is arranged to shift said computer from said normal mode to said low electric energy consuming mode when detecting that said power supply output level has become lower than said given level during said charging action on said flash circuit.

13. A camera having a computer for controlling an operation of a load circuit, comprising:
   a) a power source circuit for supplying power to the load circuit;
   b) a capacitor to be charged by an output of said power source circuit;
   c) a detection circuit for detecting a charge level of said capacitor; and
   d) a change-over circuit for changing over said computer from a normal operative mode to a low electric energy consuming mode when said detection circuit detects that the charge level of said capacitor becomes lower than a predetermined state.

14. A camera according to claim 13, wherein said capacitor is connected to said power source circuit through switching means, which turns off when an operation member shifts from a first operation state to a second operation state.

15. A camera according to claim 13, wherein said low electric energy consuming mode is a hold mode.

16. A camera having a computer for controlling a camera operation, comprising;
   a) a power supply circuit for supplying power to a load circuit,
   b) a detection circuit for detecting an output voltage level of said power supply circuit;
   c) a change-over circuit for changing over the computer from a normal operation mode to a low electric energy consuming operation mode when said detection circuit detects that the output voltage level of said power supply circuit becomes lower than a predetermined detection level; and
   d) a level adjusting circuit for changing the detection level from a first level to a second level which is different from the first level in accordance with an operation condition of the camera.

17. A camera according to claim 16, wherein said power supply circuit supplies power to the computer.

18. A camera having a computer for controlling a camera operation, comprising:
   a) an oscillation circuit arranged to supply a clock signal for an operation of said computer;
   b) an operation control circuit arranged to render said oscillation circuit operative and to cause said computer to operate a given period of time after said oscillation circuit begins to operate;
   c) a change-over circuit for changing over said given period of time from a first period to a second period which is different from the first period in accordance with an operation condition of the camera.

* * * * *

UNITED STATES PATENT AND TRADEMARK OFFICE
CERTIFICATE OF CORRECTION

PATENT NO. : 5,053,804

DATED : October 1, 1991

INVENTOR(S) : Yukio Odaka et al.

It is certified that error appears in the above-identified patent and that said Letters Patent is hereby corrected as shown below:

COLUMN 5:
    Line 45, "show" should read --shows--.

COLUMN 9:
    Line 57, "execute" should read --executes--.

COLUMN 13:
    Line 5, "is" should read --are--.

COLUMN 14:
    Line 11, "concell-" should read --cancell- --:
    Line 31, "37 0"" should read --"0",--;
    Line 33, "flow-chart" should read --flowchart--; and
    Line 34, "flow chart" should read --flowchart--;

COLUMN 15:
    Line 64, "37 0"" should read --"0"--; and
    Line 67, "an" should read --a--.

COLUMN 18:
    Line 29, "that" should be deleted.

UNITED STATES PATENT AND TRADEMARK OFFICE
CERTIFICATE OF CORRECTION

PATENT NO. : 5,053,804  Page 2 of 2
DATED : October 1, 1991
INVENTOR(S) : Yukio Odaka et al.

It is certified that error appears in the above-identified patent and that said Letters Patent is hereby corrected as shown below:

COLUMN 19:

Line 7, "supplied-to" should read --supplied to--; and
　　Line 42, "37 0"," should read --"0",--;

COLUMN 20:
　　Line 24, "37 0"" should read --"0"--; and
　　Line 28, "37 0"." should read --"0".--.

Signed and Sealed this

Fourth Day of May, 1993

Attest:

MICHAEL K. KIRK

*Attesting Officer*　　*Acting Commissioner of Patents and Trademarks*